(12) United States Patent
Couture-Pelletier et al.

(10) Patent No.: US 11,014,607 B2
(45) Date of Patent: May 25, 2021

(54) STEERING SYSTEM FOR A VEHICLE

(71) Applicant: BOMBARDIER RECREATIONAL PRODUCTS INC., Valcourt (CA)

(72) Inventors: Mathieu Couture-Pelletier, Bromont (CA); Kevin Cyrenne, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 77 days.

(21) Appl. No.: 16/427,425

(22) Filed: May 31, 2019

(65) Prior Publication Data

US 2019/0367088 A1 Dec. 5, 2019

Related U.S. Application Data

(60) Provisional application No. 62/826,583, filed on Mar. 29, 2019, provisional application No. 62/678,694, filed on May 31, 2018.

(51) Int. Cl.
*B62D 7/16* (2006.01)
*B62D 1/02* (2006.01)
(Continued)

(52) U.S. Cl.
CPC .............. *B62D 7/16* (2013.01); *B62D 1/02* (2013.01); *B62K 5/08* (2013.01); *B62K 21/16* (2013.01);
(Continued)

(58) Field of Classification Search
CPC ... B62D 7/16; B62D 1/02; B62D 1/10; B62K 5/027; B62K 5/05; B62K 5/08;
(Continued)

(56) References Cited

U.S. PATENT DOCUMENTS 4,620,715 A * 11/1986 Takahashi .............. B60K 17/30
180/254
4,683,737 A * 8/1987 Armstrong .............. B60R 25/02
70/252

(Continued)

FOREIGN PATENT DOCUMENTS

WO   WO2017072732 A1   5/2017
WO   WO2018142307 A1   8/2018

*Primary Examiner* — Keith J Frisby
(74) *Attorney, Agent, or Firm* — BCF LLP

(57) ABSTRACT

A steering system for a vehicle is provided. The steering system has a handlebar assembly and a steering column assembly connected to the handlebar assembly. The handlebar assembly includes a first conical surface and a first angular position limiter. The steering column assembly includes a second conical surface mated with the first conical surface, and a second angular position limiter configured to engage the first angular position limiter to limit an angular position of the handlebar assembly relative to the steering column assembly about a steering axis of the steering system. A compression element engages the handlebar assembly and the steering column assembly to compress the first and second conical surfaces against one another in order to fix the handlebar assembly to the steering column assembly. A plurality of linkages is configured to operatively connect the steering column assembly to at least one ground-engaging member of the vehicle.

22 Claims, 25 Drawing Sheets

(51) Int. Cl.
*B62K 5/08* (2006.01)
*B62K 21/16* (2006.01)
*F16D 1/12* (2006.01)
B62K 5/027 (2013.01)
B62K 5/05 (2013.01)

(52) U.S. Cl.
CPC ............... *F16D 1/12* (2013.01); *B62K 5/027* (2013.01); *B62K 5/05* (2013.01); *F16C 2326/24* (2013.01)

(58) Field of Classification Search
CPC ........ B62K 21/12; B62K 21/18; B62K 21/16; B62K 21/22; Y10T 74/20834; Y10T 74/2078; Y10T 74/20792; F16C 2326/24; F16D 1/12
USPC ........ 280/93.502, 775; 74/552, 551.3, 551.1, 74/493
See application file for complete search history.

(56) References Cited

U.S. PATENT DOCUMENTS

| | | | |
|---|---|---|---|
| 7,661,506 B2 * | 2/2010 | Saito | ........................ B62K 5/01 180/444 |
| 2003/0089166 A1 | 5/2003 | Mizuno et al. | |

* cited by examiner

STEERING SYSTEM FOR A VEHICLE

CROSS-REFERENCE

The present application claims priority to U.S. Provisional Patent Application No. 62/826,583, filed on Mar. 29, 2019, and to U.S. Provisional Patent Application No. 62/678,694, filed on May 31, 2018, the entirety of each of which is incorporated herein by reference.

TECHNICAL FIELD

The present technology relates to steering systems for vehicles.

BACKGROUND

A vehicle's steering system often undergoes an alignment process to ensure that the steerable ground-engaging components (e.g., wheels, skis, etc.) of the vehicle are aligned with the steering control (e.g., handlebar) of the vehicle. This aligning process can be done by the manufacturer, the dealer and/or the operator of the vehicle.

In a conventional wheeled vehicle having a handlebar, the alignment process for the steering system can be relatively elaborate, notably involving adjusting the length of the vehicle's tie rods, which operatively connect the wheels to a steering column of the steering system, to ensure that when the steerable wheels are in their straight vehicle movement orientation (i.e., in a 0° turn position in which the vehicle moves in a straight line), the handlebar is also in a straight orientation.

In addition, this alignment process does not ensure that a Pitman arm of the vehicle is equally in its straight orientation. The Pitman arm is a mechanical element that extends radially outward from and rotates with a steering column of the vehicle and pivotally connects to at least one linkage (e.g., a tie rod) so as to convert rotation of the steering column to a translation of the linkage(s). Thus, while the handlebar and steerable wheels are in their straight orientations, the Pitman arm, and any of the steering components extending between the handlebar and the tie rods, may be misaligned relative thereto. When this misalignment is sufficiently large, the vehicle can be subject to undesirable dynamic effects such as bump steer (i.e., when the steerable wheels steer themselves without any input at the handlebar as a result of a displacement of the suspension), as well as a tendency for the vehicle to pull toward the left or right side during acceleration or deceleration.

Similar effects can be observed when the vehicle is equipped with a rack-and-pinion assembly instead of a Pitman arm.

There is therefore a desire for a steering system for a vehicle that addresses at least some of these drawbacks.

SUMMARY

It is an object of the present technology to ameliorate at least some of the inconveniences present in the prior art.

According to one aspect of the present technology, there is provided a steering system for a vehicle. The vehicle has at least one ground-engaging member. The steering system includes a handlebar assembly and a steering column assembly connected to the handlebar assembly. The handlebar assembly has a first conical surface and a first angular position limiter. The steering column assembly has a second conical surface mated with the first conical surface, and a second angular position limiter configured to engage the first angular position limiter to limit an angular position of the handlebar assembly relative to the steering column assembly about a steering axis of the steering system. The steering system also includes a compression element engaging the handlebar assembly and the steering column assembly to compress the first and second conical surfaces against one another in order to fix the handlebar assembly to the steering column assembly. The steering system also includes a plurality of linkages configured to operatively connect the steering column assembly to the at least one ground-engaging member of the vehicle.

In some embodiments, the first conical surface is a male conical surface and the second conical surface is a female conical surface.

In some embodiments, the first angular position limiter is one of a radially-extending protrusion and a radially-extending groove, and the second angular position limiter is an other one of the radially-extending protrusion and the radially-extending groove. The radially-extending groove receives the radially-extending protrusion therein.

In some embodiments, the handlebar assembly includes the radially-extending protrusion and the steering column assembly includes the radially-extending groove.

In some embodiments, the compression element is a fastener that extends through the handlebar assembly and threadedly engages the steering column assembly.

In some embodiments, the radially-extending groove is larger than the radially-extending protrusion such that the radially-extending protrusion can be positioned within a range of angular positions about the steering axis relative to the radially-extending groove.

In some embodiments, the range of angular positions spans less than 10 degrees.

In some embodiments, the range of angular positions spans less than 4 degrees.

In some embodiments, the range of angular positions spans approximately 3.6 degrees.

In some embodiments, the handlebar assembly includes a handlebar and a base. The handlebar is affixed to the base. The base has the first conical surface and the first angular position limiter.

In some embodiments, the steering column assembly includes an upper connecting portion connected to the handlebar assembly and a column portion extending downward from the upper connecting portion. The upper connecting portion has the second conical surface and the second angular position limiter.

In some embodiments, the column portion is a first column portion. The steering column assembly also includes a second column portion, and a universal joint connecting the first and second column portions.

In some embodiments, the plurality of linkages includes at least one tie rod.

In some embodiments, the at least one ground-engaging member includes two ground-engaging members, and the plurality of linkages includes two tie rods.

In some embodiments, the steering column assembly also includes a Pitman arm extending radially outward at a lower end of the steering column assembly. The Pitman arm rotates together with a remainder of the steering column assembly. The Pitman arm is pivotally connected to the plurality of linkages.

In some embodiments, the steering system also includes a lock for locking the Pitman arm with respect to a frame of the vehicle during assembly thereof.

In some embodiments, the lock includes an opening defined by one of the steering column assembly and the plurality of linkages. The opening of the one of the steering column assembly and the plurality of linkages is configured to be aligned with a corresponding opening defined by the frame of the vehicle when the Pitman arm is in a zero position.

In some embodiments, the one of the steering column assembly and the plurality of linkages is the steering column assembly.

In some embodiments, the steering column assembly also includes an attachment extension connected to the Pitman arm. The attachment extension defines the opening.

In some embodiments, the steering column assembly also includes a housing enclosing at least part of the upper connecting portion. The housing receives an axial load applied thereto by the upper connecting portion of the steering column assembly.

In some embodiments, the column portion includes a tube, and the upper connecting portion includes a handlebar support receiving member at least partly inserted within the tube. The handlebar support receiving member defines the second conical surface and the second angular position limiter.

According to another aspect of the present technology, there is provided a vehicle including: a frame, a seat mounted to the frame, at least one steerable ground-engaging member mounted to the frame; at least one suspension assembly connecting the at least one steerable ground-engaging member to the frame; and the steering system of as defined above.

For purposes of this application, terms related to spatial orientation such as forward, rearward, upward, downward, left, and right, as they are used in this document refer to general directions as would be understood by a driver of a vehicle sitting in a driver seat of the vehicle and facing in a straight forward driving direction. Terms related to spatial orientation when describing or referring to components or sub-assemblies of a vehicle separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described herein with respect to a three-wheeled straddle-type vehicle 100. It is contemplated that the present technology could also be implemented with vehicles that have two, four, or more wheels, as well as with other types of vehicles including, but not limited to, snowmobiles.

Figure 1:
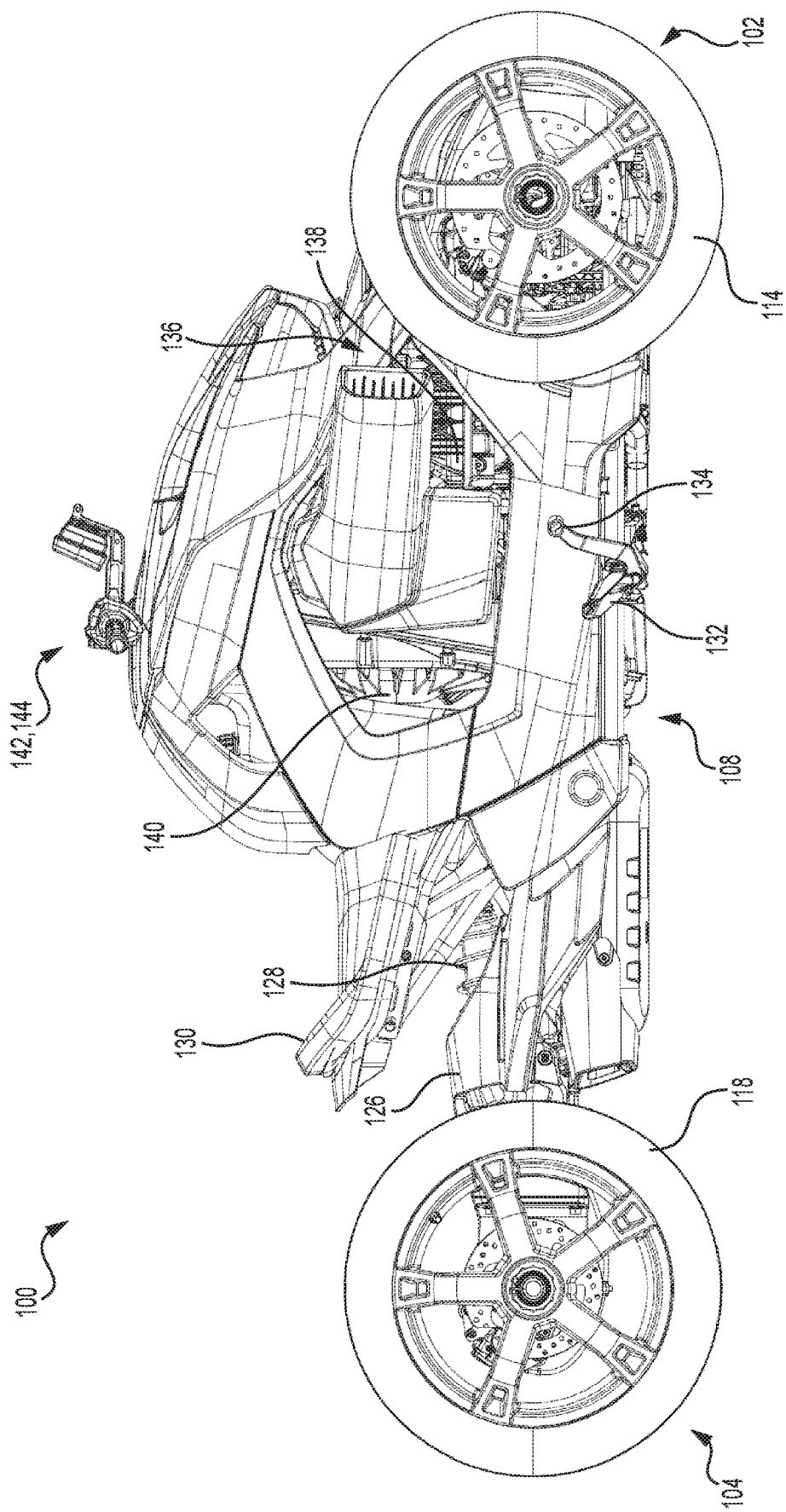
FIG. 1 is a right side elevation view of a vehicle.
Figure 2:
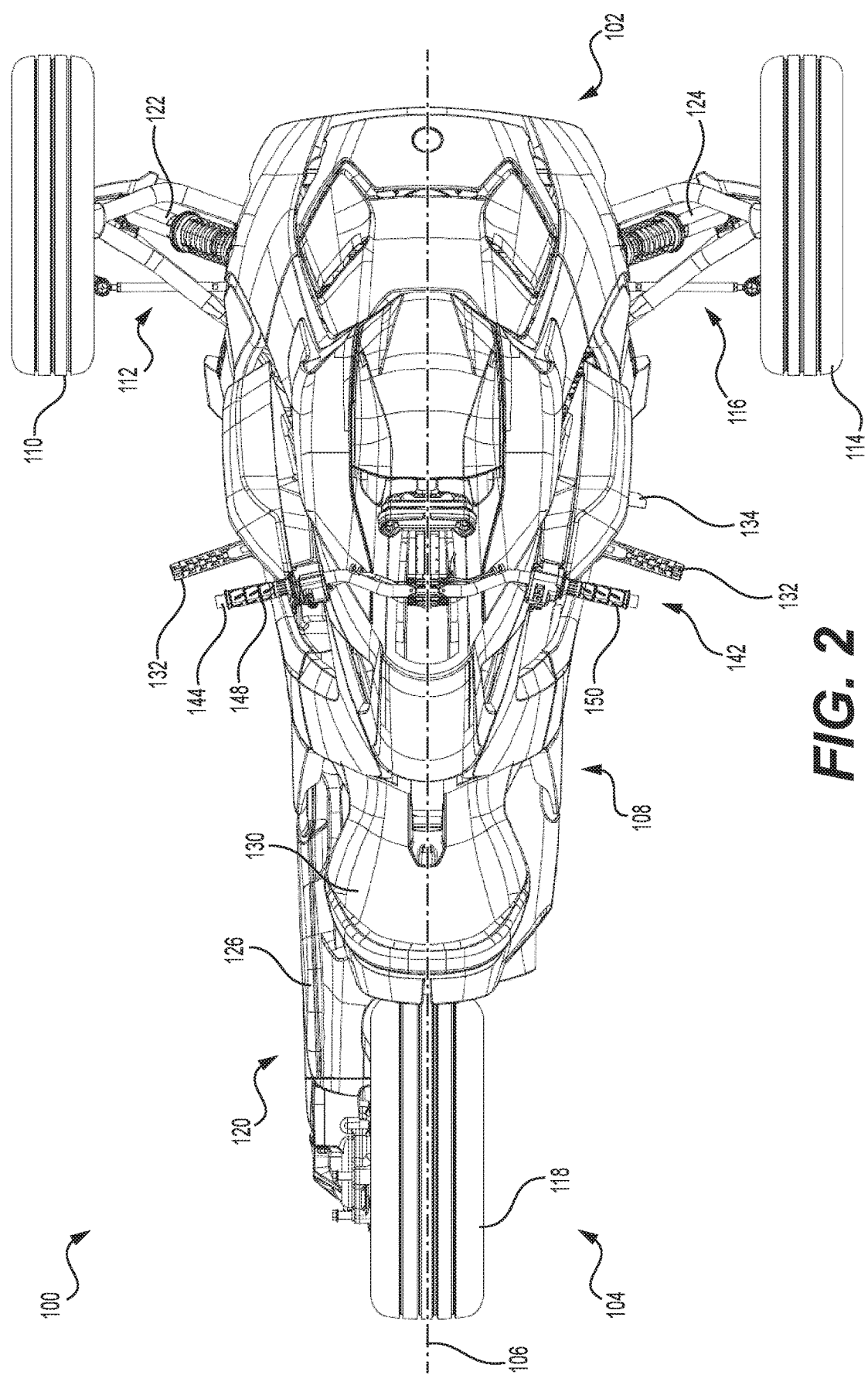
FIG. 2 is a top plan view of the vehicle of FIG. 1.
Figure 3:
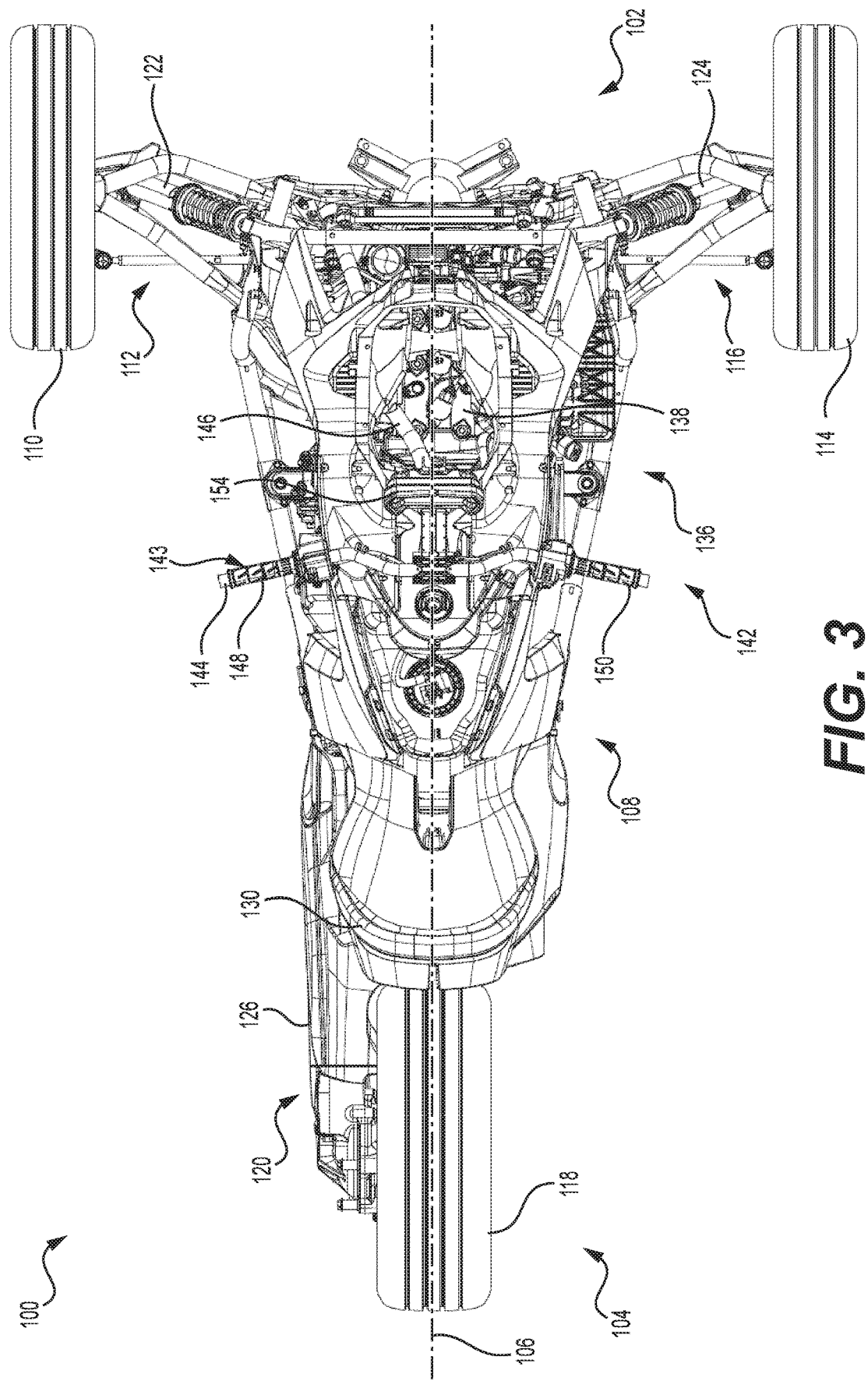
FIG. 3 is a top plan view of the vehicle of FIG. 1, with some panels of the vehicle removed to better show internal components of the vehicle.

With reference to FIGS. 1 to 3, a vehicle 100 has a front end 102, a rear end 104, and a longitudinal centerplane 106 (FIGS. 2 and 3) defined consistently with the forward travel direction of the vehicle 100. The vehicle 100 has a frame 108, a left front wheel 110 mounted to the frame 108 on a left side thereof by a left front suspension assembly 112, and a right front wheel 114 mounted to the frame 108 on a right side thereof by a right front suspension assembly 116. More specifically, the left and right front wheels 110, 114 are rotatably mounted to left and right steering knuckles 117, 119 (FIG. 4) which are supported by the left and right front suspension assemblies 112, 116. A single rear wheel 118 is mounted to the frame 108 at a rear end thereof by a rear suspension assembly 120. The left and right front wheels 110, 114 and the rear wheel 118 each have a tire secured thereto. The front wheels 110, 114 are disposed equidistant from the longitudinal centerplane 106, and the rear wheel 118 is centered with respect to the longitudinal centerplane 106.

In the illustrated embodiment and as can be seen in FIGS. 2 and 3, each front suspension assembly 112, 116 is a double A-arm type suspension, also known as a double wishbone suspension, and includes a corresponding shock absorber 122, 124. It is contemplated that other types of front suspensions, such as a McPherson strut suspension, or swing arm could be used. The rear suspension assembly 120 includes a swing arm 126 and a shock absorber 128 (FIG. 1). The shock absorber 128 is connected between the swing arm 126 and the frame 108. It is contemplated that other types of rear suspensions could be used.

The vehicle 100 has a straddle seat 130 mounted to an upper portion of the frame 108 and disposed along the longitudinal centerplane 106. It is contemplated that other mounting locations could be used. In the illustrated embodiment, the straddle seat 130 is designed to accommodate a single adult-sized rider, i.e. the driver. It is contemplated that other types of seats could be used such as a seat having a driver portion and a passenger portion.

Driver footrests 132 are disposed on both sides of the vehicle 100 to support the driver's feet (see FIGS. 2 and 3). The driver footrests 132 are connected to a lower portion of the frame 108. The driver footrests 132 are in the form of foot pegs disposed longitudinally forward of the straddle seat 130. It is also contemplated that the footrests 132 could be in the form of footboards. It is contemplated that the vehicle 100 could also be provided with passenger footrests disposed rearward of the driver footrests 132 on both sides of the vehicle 100, for supporting a passenger's feet when a passenger seat portion for accommodating a passenger is provided. A brake pedal 134 is connected to the right driver footrest 132 for braking the vehicle 100. The brake pedal 134 extends upwardly and forwardly from the right driver footrest 132 such that the driver can actuate the brake pedal 134 with a front portion of the right foot while a rear portion of the right foot remains on the right driver footrest 132.

As can be seen in FIGS. 1 and 3, the vehicle 100 includes a power pack 136, including a motor 138 and a transmission assembly 140 (FIG. 1). The power pack 136 is supported by and is housed within the frame 108. The transmission assembly 140 includes a continuously variable transmission (CVT) and a transfer case. The motor 138 is in the form of an internal combustion engine. It is however contemplated that the motor 138 could be other than an internal combustion engine, for example an electric motor, a hybrid or the like. It is also contemplated that the transmission assembly 140 could be of another type. The motor 138 is operatively connected to the rear wheel 118 via the transmission assembly 140 to drive the rear wheel 118.

Figure 4:
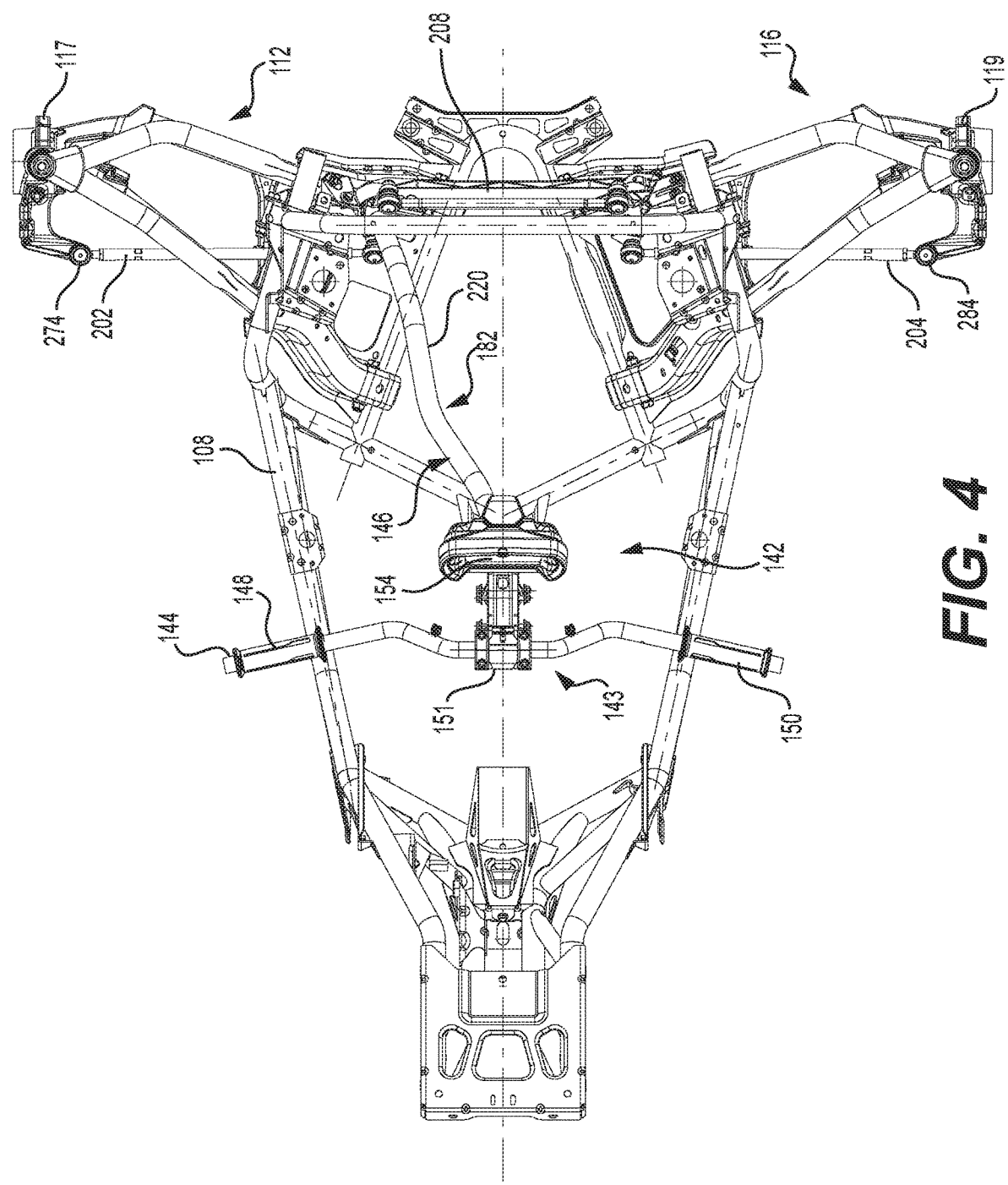
FIG. 4 is a top plan view of parts of a frame and of a steering system of the vehicle of FIG. 1.
Figure 5:
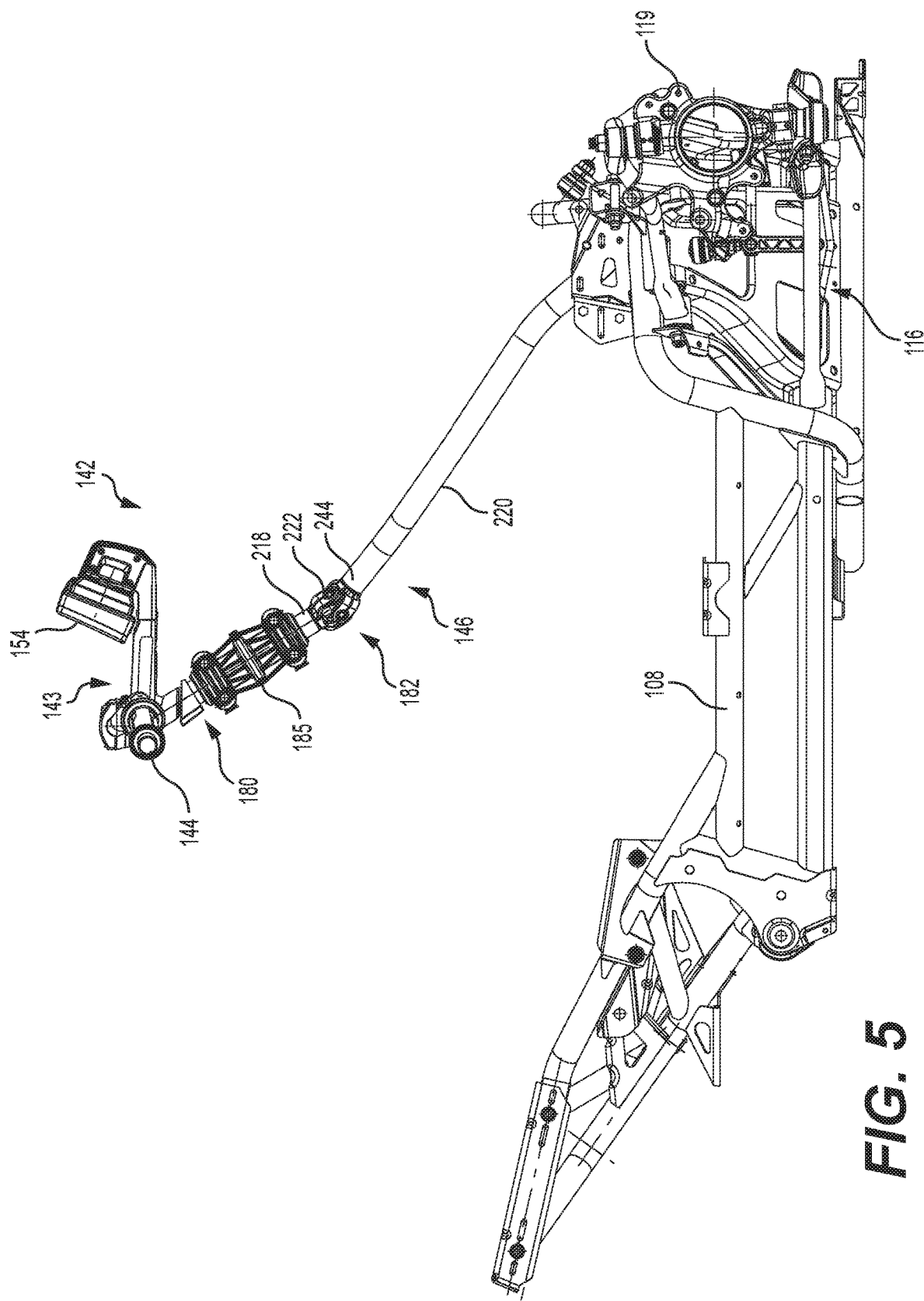
FIG. 5 is a right side elevation view of the components of FIG. 4.
Figure 9:
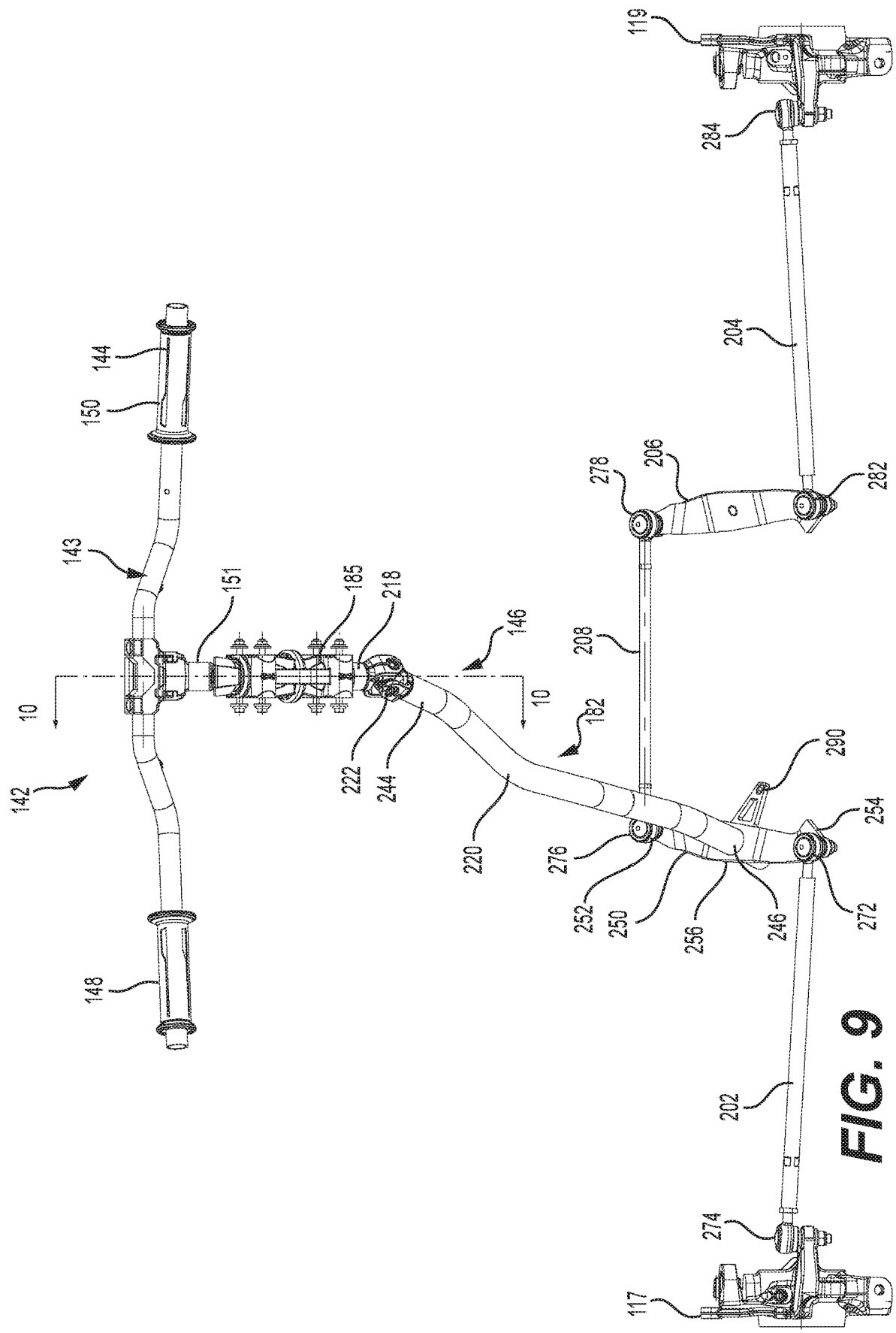
FIG. 9 is a rear elevation view of the steering system of the vehicle of FIG. 1.

With reference to FIGS. 4, 5 and 9, the vehicle 100 has a steering system 142 that includes a handlebar assembly 143, a steering column assembly 146 connected to the handlebar assembly 143, and a plurality of linkages 202, 204, 206, 208 operatively connecting the steering column assembly 146 to the steering knuckles 117, 119.

Figure 12:
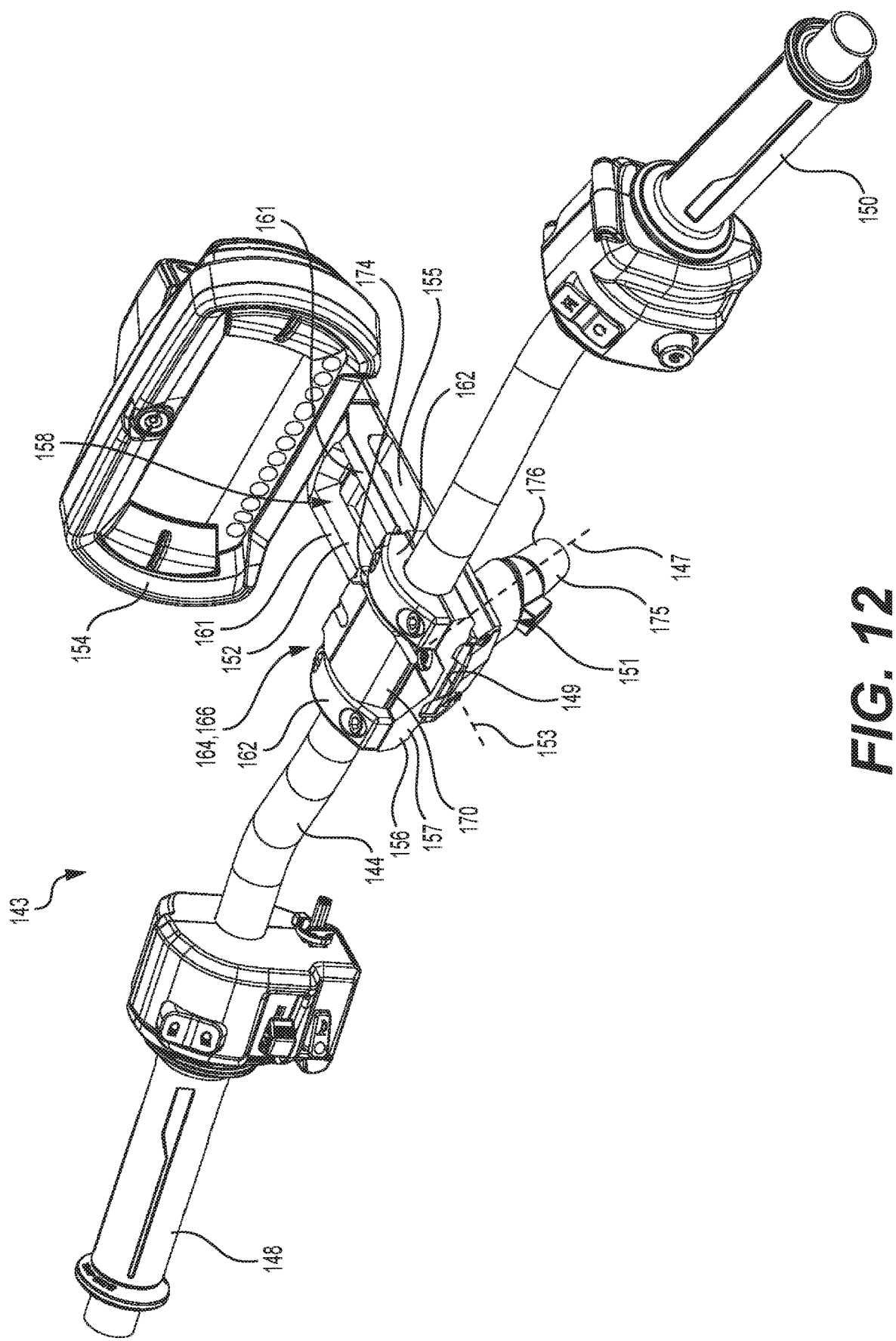
FIG. 12 is rear, right, top side perspective view of a handlebar assembly of the steering system of FIG. 9.

The handlebar assembly 143 includes a handlebar 144 which is disposed forward of the seat 130 (FIGS. 2 and 3). A left hand grip 148 is placed around the left side of the handlebar 144 near the left end thereof and a right hand grip 150 is placed around the right side of the handlebar 144 near the right end thereof. The right hand grip 150 has a twist-grip type throttle control. It is contemplated that a different type and/or position of throttle control could be used. The handlebar 144 is operatively connected to the front wheels 110, 114 via the steering column assembly 146 (FIG. 3). As can be seen in FIG. 12, the steering system 142 defines a steering axis 147 about which the handlebar 144 rotates with respect to the frame 108. The handlebar 144 is turned by the driver about the steering axis 147 to steer the front wheels 110, 114 and thereby steer the vehicle 100.

It should be understood that the front wheels 110, 114 are one example of steerable ground-engaging components with which embodiments of the steering system 142 could be used. It is contemplated that embodiments of the steering system 142 could be used on vehicles where the steerable ground-engaging component(s) is/are skis or endless tracks for example.

Figure 13:
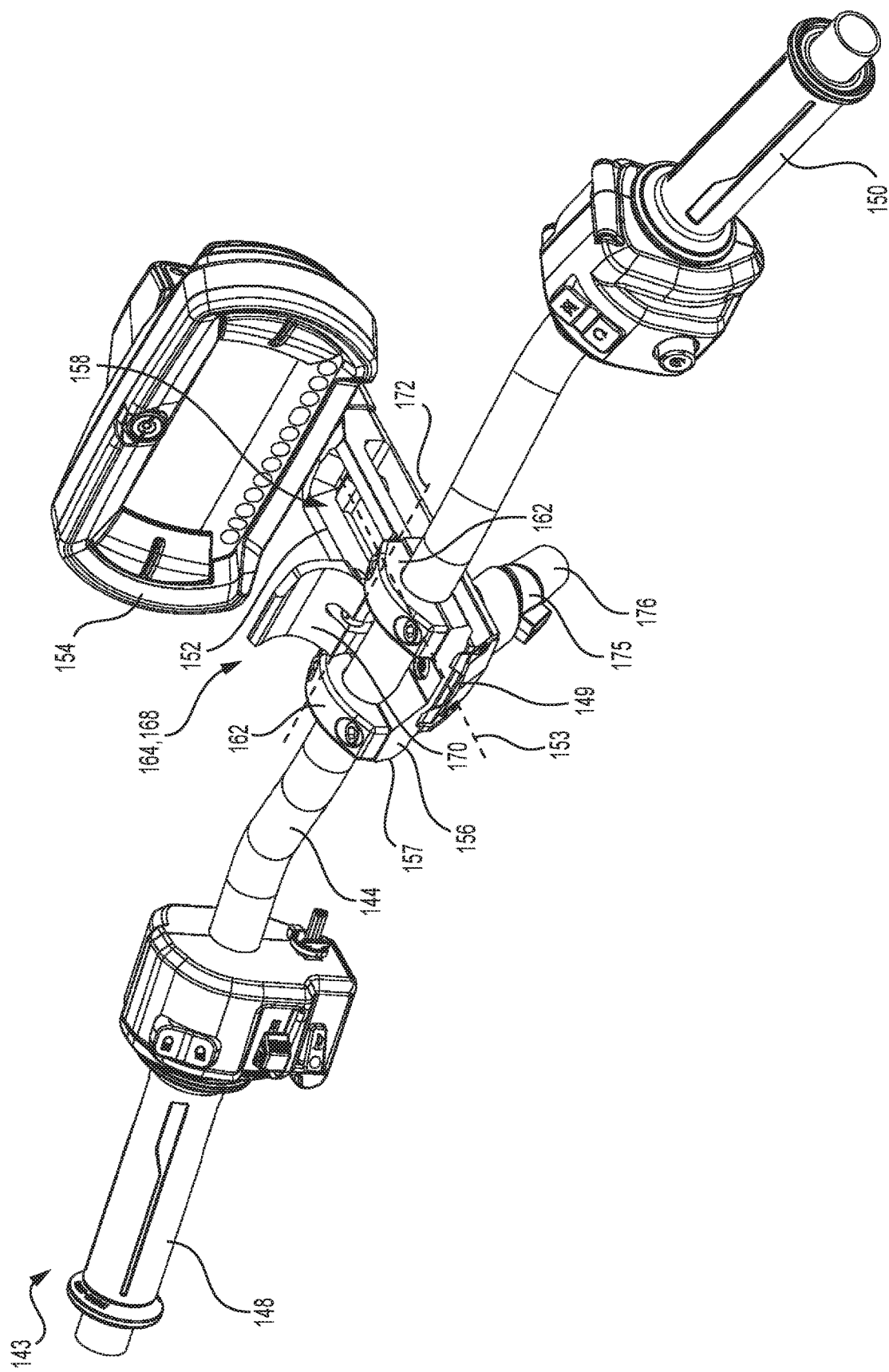
FIG. 13 is a rear, right, top side perspective view of that handlebar assembly of FIG. 12, with a lock actuator of the handlebar assembly being in an unlocked positioned and a handlebar of the handlebar assembly being in a rearmost adjustment position.
Figure 14:
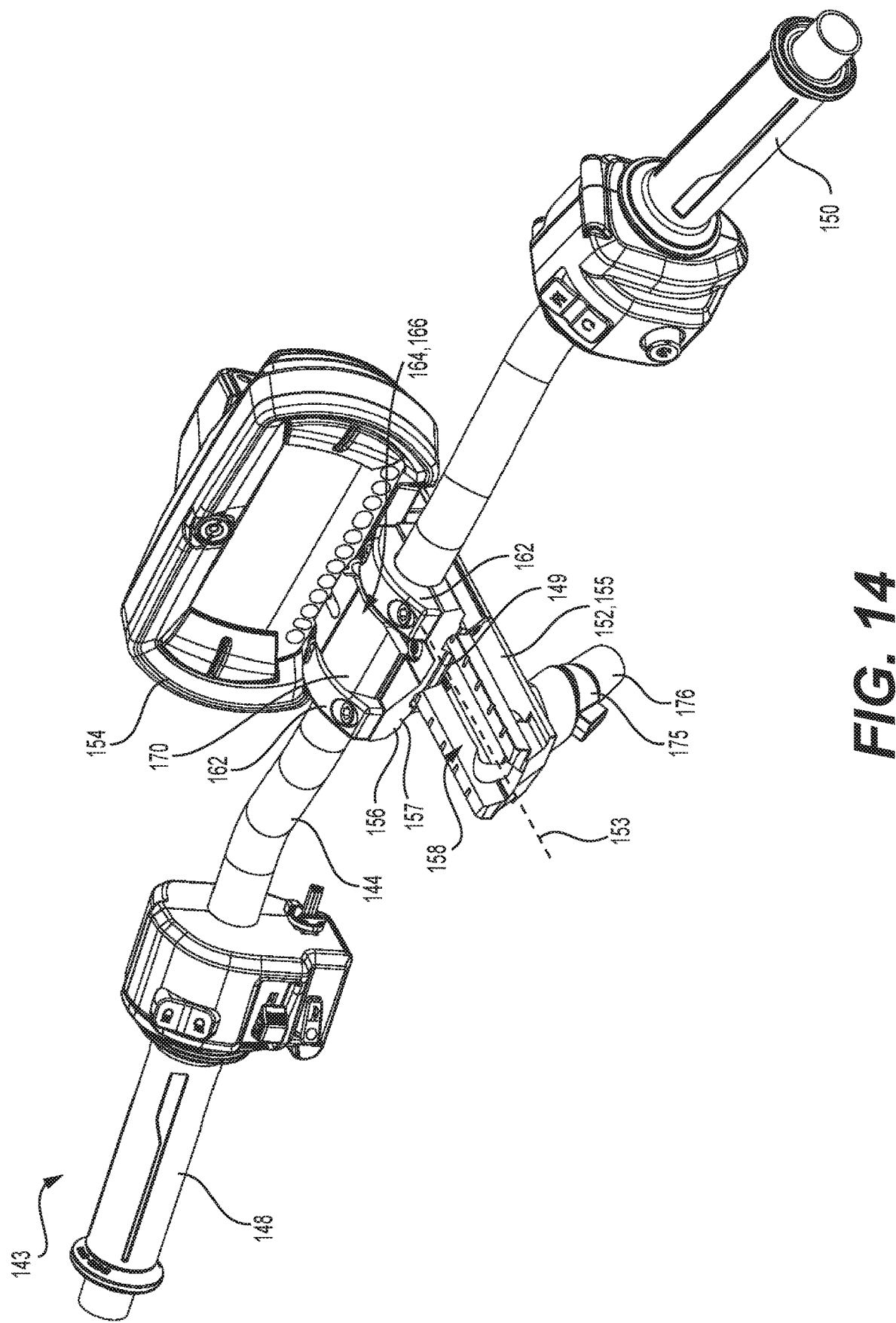
FIG. 14 is a rear, right, top side perspective view of the handlebar assembly of FIG. 12, with the lock actuator of the handlebar assembly being in a locked position and the handlebar being in a frontmost adjustment position.

With reference to FIGS. 12 to 15, the handlebar assembly 143 also includes a base 151 to which the handlebar 144 is affixed. As will be explained in greater detail below, the base 151 is connected to an upper end of the steering column assembly 146 such that the base 151 pivots together with the steering column assembly 146. As best shown in FIG. 14, the base 151 has a track 152 which, in this embodiment, includes two parallel rails 161 at a top side thereof, and a lower portion 155 below the rails 161. The rails 161 provide angled surfaces 158 (one surface 158 per rail 161, in this embodiment), which extend downwardly and inwardly toward a plane of symmetry of the track 152. A plurality of marks 159 are provided on the rails 161 to provide a visual indication of the different handlebar longitudinal adjustment positions (described in more detail herein below) of the steering system 142. It is contemplated that the marks 159 could be omitted. It is contemplated that a different number and/or arrangement of rails 161 could be used, depending on the particular configuration of the components to be connected thereto which are described below.

In this embodiment, when the steering system 142 is in a position corresponding to a straight vehicle movement orientation of the front wheels 110, 114 (i.e., in a 0° turn position in which the vehicle 100 moves in a straight line), as shown in FIGS. 2 and 3, the track 152 is centered with respect to the longitudinal centerplane 106 and is disposed along the longitudinal centerplane 106. An instrument display 154, also referred to as a gauge, is connected to a front portion of the track 152. It is contemplated that in some embodiments, the instrument display 154 could have a different position on the vehicle 100 and/or could be omitted.

As can be seen in FIGS. 12 to 14, the steering system 142 further includes a slider 156. The slider 156 includes a top portion 157 receiving the handlebar 144 and a central portion 149 defining longitudinal opposed angled surfaces for clamping against the rails 161. The slider 156 is slidably connected to the track 152 and is slidable along the track 152 about a sliding axis 153 defined by the track 152 to a plurality of different adjustment positions distributed along the sliding axis 153. In this implementation, the angled surfaces of the slider 156 slide along the angled surfaces 158 of the rails 161 as the slider 156 slides along the sliding axis 153 relative to the track 152 to different adjustment positions. The slider 156 also has downwardly extending side walls which help guide the sliding motion of the slider 156 relative to the track 152 and help to vertically retain the slider 156 on the track 152. A rearmost adjustment position of the plurality of different adjustment positions is shown in FIG. 12. A frontmost adjustment position of the plurality of different adjustment positions is shown in FIG. 14.

The handlebar 144 is connected to the slider 156 at the top portion 157 of the slider 156, via two brackets 162. The two brackets 162 are fastened to the top portion 157 of the slider 156 via corresponding bolts. In this embodiment, the brackets 162 clamp the handlebar 144 to the top portion 157 of the slider 156 and thereby immobilize it relative to the slider 156. The handlebar 144 therefore slides with the slider 156 relative to the track 152 along the sliding axis 153. It is contemplated that a different mounting of the handlebar 144 to the slider 156 could be used.

As can be seen in FIGS. 12 to 14, the handlebar assembly 143 also includes a lock actuator 164 for selectively locking the slider 156 and the handlebar 144 at the rearmost adjustment position, at the frontmost adjustment position, or at any adjustment position therebetween along the sliding axis 153. The lock actuator 164 is movable between a locked position 166 (FIGS. 12 and 14), in which it locks the slider 156 and the handlebar 144 relative to the track 152 in a given one of the different adjustment positions, and an unlocked position 168 (FIG. 13) in which it allows the slider 156 and the handlebar 144 to slide to any one of the different adjustment positions along the track 152. As can be seen in FIGS. 12 and 13, the lock actuator 164 includes a lever 170 which is manually pivotable about a lever pivot axis 172. The lever 170 is pivotable about the lever pivot axis 172 between the locked position 166 and the unlocked position 168. To this end, the lever 170 is pivotably mounted over a shaft 174 that defines the lever pivot axis 172. A full description of the manner in which the lock actuator 164 operates is provided in U.S. Provisional Patent Application No. 62/678,694, which is incorporated by reference herein.

It is contemplated that, in some embodiments, the track 152 and the slider 156 could be omitted and the longitudinal position of the handlebar 144 could be fixed instead or could be adjusted via some other assembly.

Figure 17:
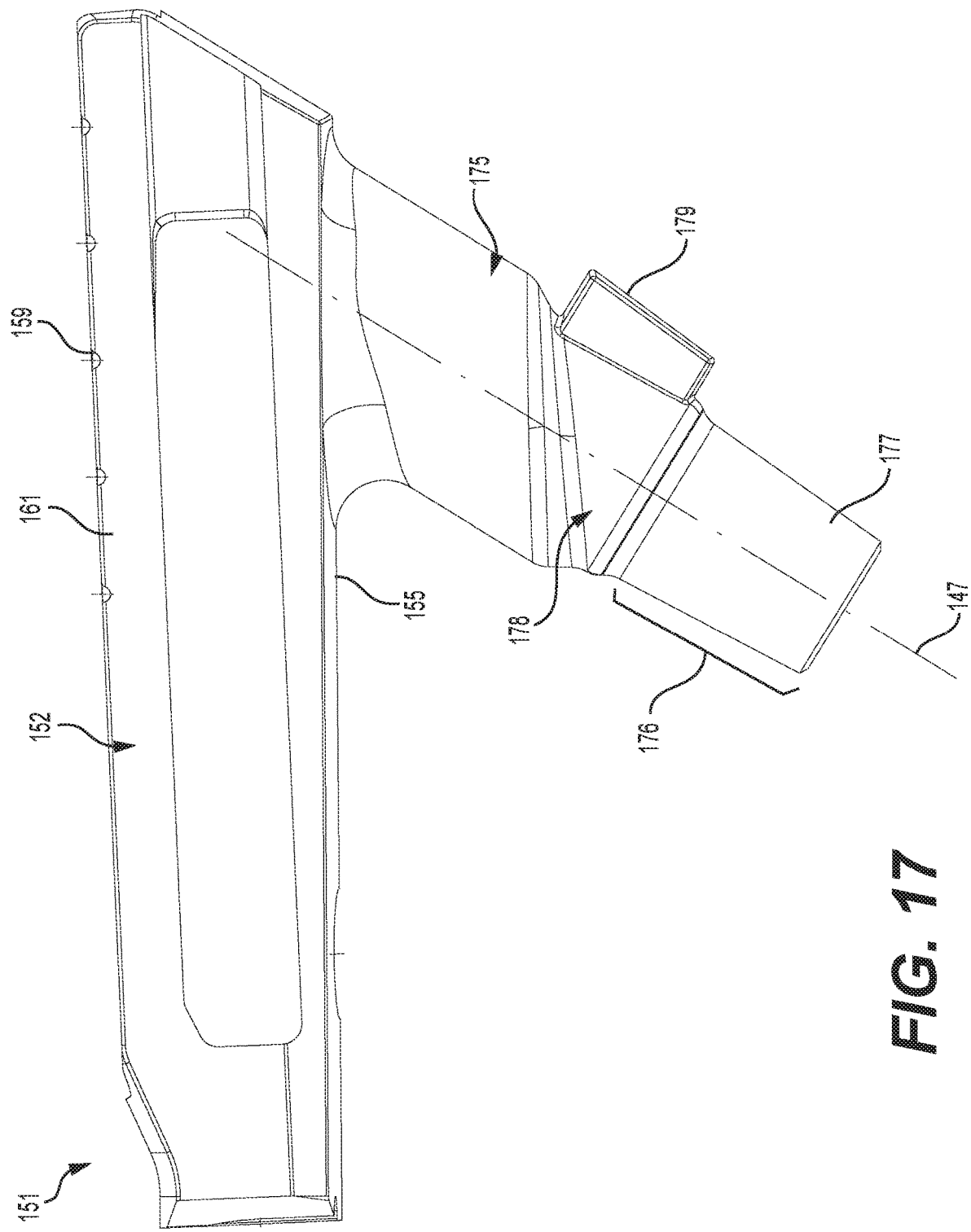
FIG. 17 is a left side elevation view of the base of FIG. 15.
Figure 18:
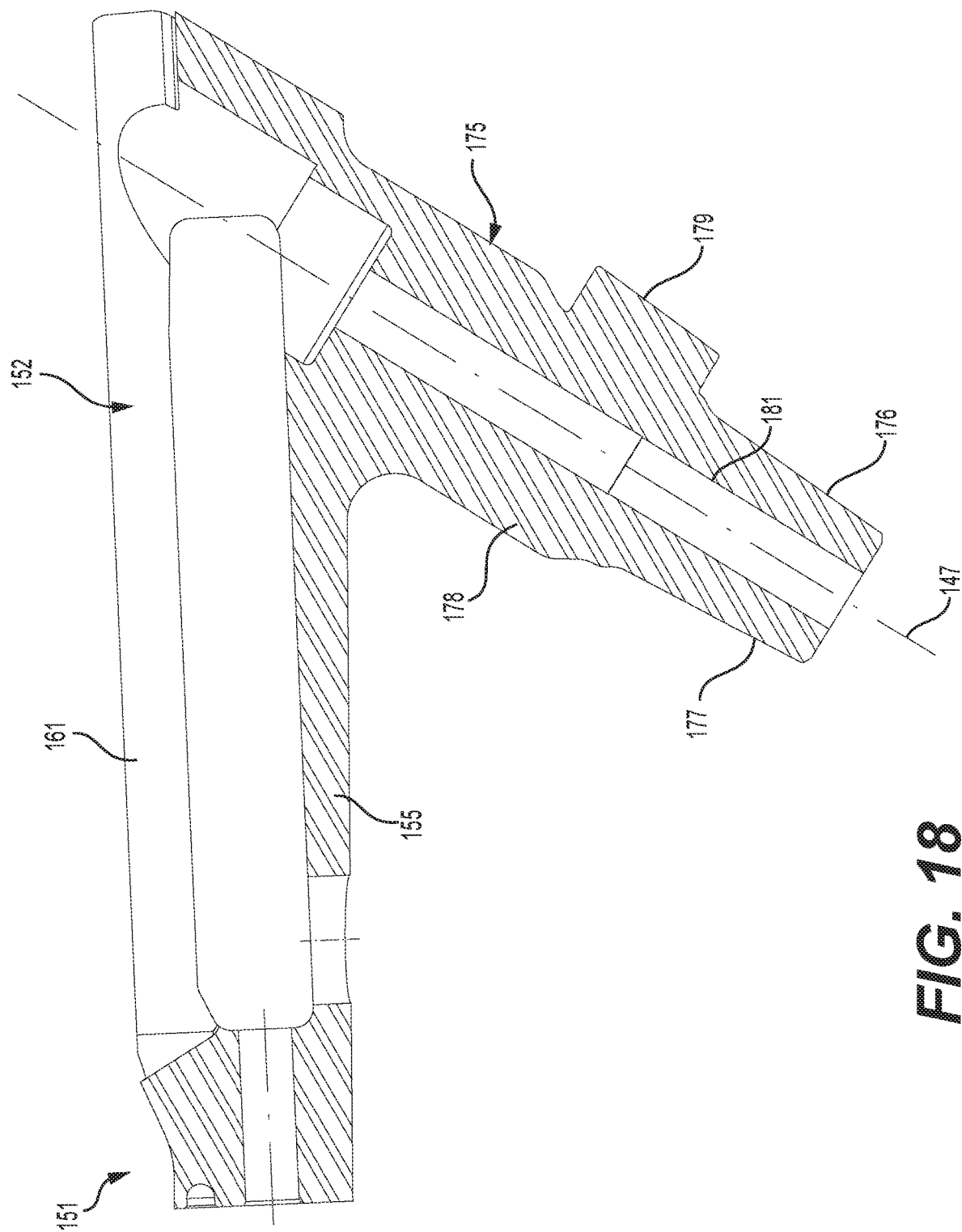
FIG. 18 is a cross-sectional view of the base of FIG. 15, taken along line 18-18 in FIG. 16.

With reference now to FIGS. 15 to 18, the base 151 of the handlebar assembly 143 includes a base support 175 which extends downward from the lower portion 155 of the track 152 and is connected to the steering column assembly 146. The base support 175 extends forwardly and downwardly from the lower portion 155 to define the steering axis 147 about which the handlebar 144 can be rotated. As can be seen in FIGS. 17 and 18, a lower end portion 176 of the base support 175 defines an outer conical surface 177. The outer conical surface 177 is dimensioned such that a diameter at the lower extremity of the lower end portion 176 is smaller than a diameter at the upper extremity of the lower end portion 176. As will be explained in greater detail below, the outer conical surface 177 is used to affix the handlebar assembly 143 to the steering column assembly 146.

As will be described in greater detail below, the handlebar assembly 143 is connected to the steering column assembly 146 such that an angular position of the handlebar assembly 143 relative to the steering column assembly 146 about the steering axis 147 can be adjusted. The base support 175 comprises an angular position limiter 179 which, in complement with the steering column assembly 146, limits the angular position of the handlebar assembly 143 relative to the steering column assembly 146 about the steering axis 147. Notably, the angular position limiter 179 ensures that the angular position of the handlebar assembly 143 relative to the steering column assembly 146 cannot be excessively offset. In this embodiment, the angular position limiter 179 is a protrusion which extends radially outwardly from a cylindrical upper portion 178 of the base support 175 (disposed above the lower end portion 176). More specifically, the radially-extending protrusion 179 is generally rectangular and protrudes generally rearwardly from the cylindrical upper portion 178.

As shown in FIG. 18, the base 151 of the handlebar assembly 143 has a fastener-receiving opening 181 which extends through the base support 175 along the steering axis 147. The fastener-receiving opening 181 thus extends from an upper surface of the lower portion 155 of the track 152 to the lower extremity of the base support 175. As will be described in more detail below, a fastener 210 (FIGS. 10, 11) is inserted into the fastener-receiving opening 181 to cause the base 151 to securely engage the steering column assembly 146. A cap 213 (FIGS. 10, 11) is positioned at the upper end of the fastener-receiving opening 181 to close off the fastener-receiving opening 181 once the fastener 210 is in place.

Turning again to FIG. 5, the steering column assembly 146 includes an upper connecting portion 180 connected to the handlebar assembly 143, and a lower column portion 182 connected to and extending downward from the upper connecting portion 180. Part of each of the upper connecting portion 180 and the lower column portion 182 is enclosed by a housing 185.

Figure 11:
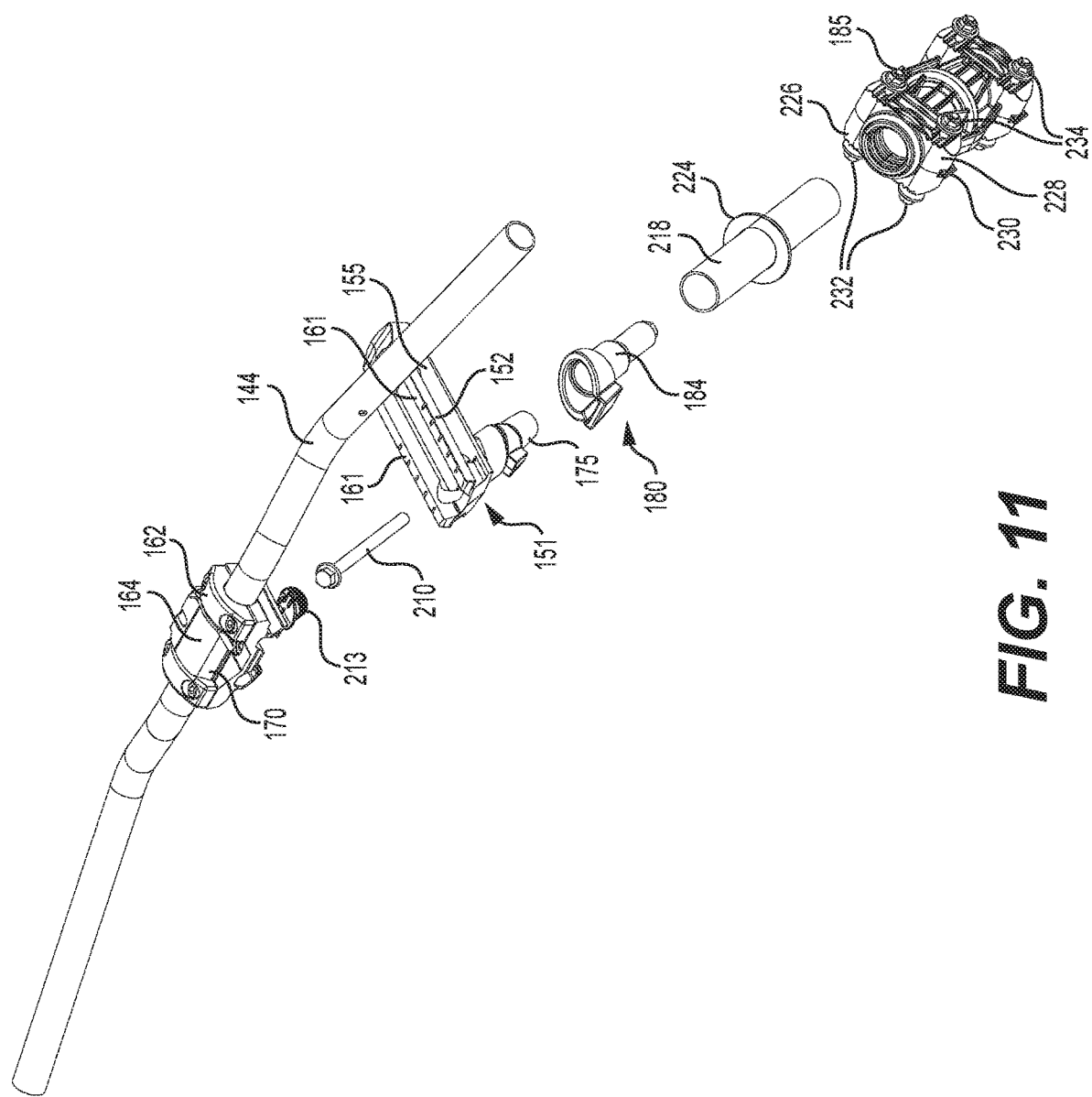
FIG. 11 is an exploded view of part of the steering system of FIG. 9.

As shown in FIG. 11, the upper connecting portion 180 has a handlebar support receiving member 184 which receives the base support 175 of the handlebar assembly 143. With reference to FIGS. 19 to 22, the handlebar support receiving member 184 is hollow and has an open upper end 186 and a closed lower end 188. The handlebar support receiving member 184 has an upper portion 192, a lower portion 194, and a central portion 196 disposed between the upper and lower portions 192, 194. Each of the lower and central portions 194, 196 has a generally cylindrical exterior. However, a diameter of the cylindrical exterior of the lower portion 194 is smaller than the diameter of the cylindrical exterior of the central portion 196.

Figure 22:
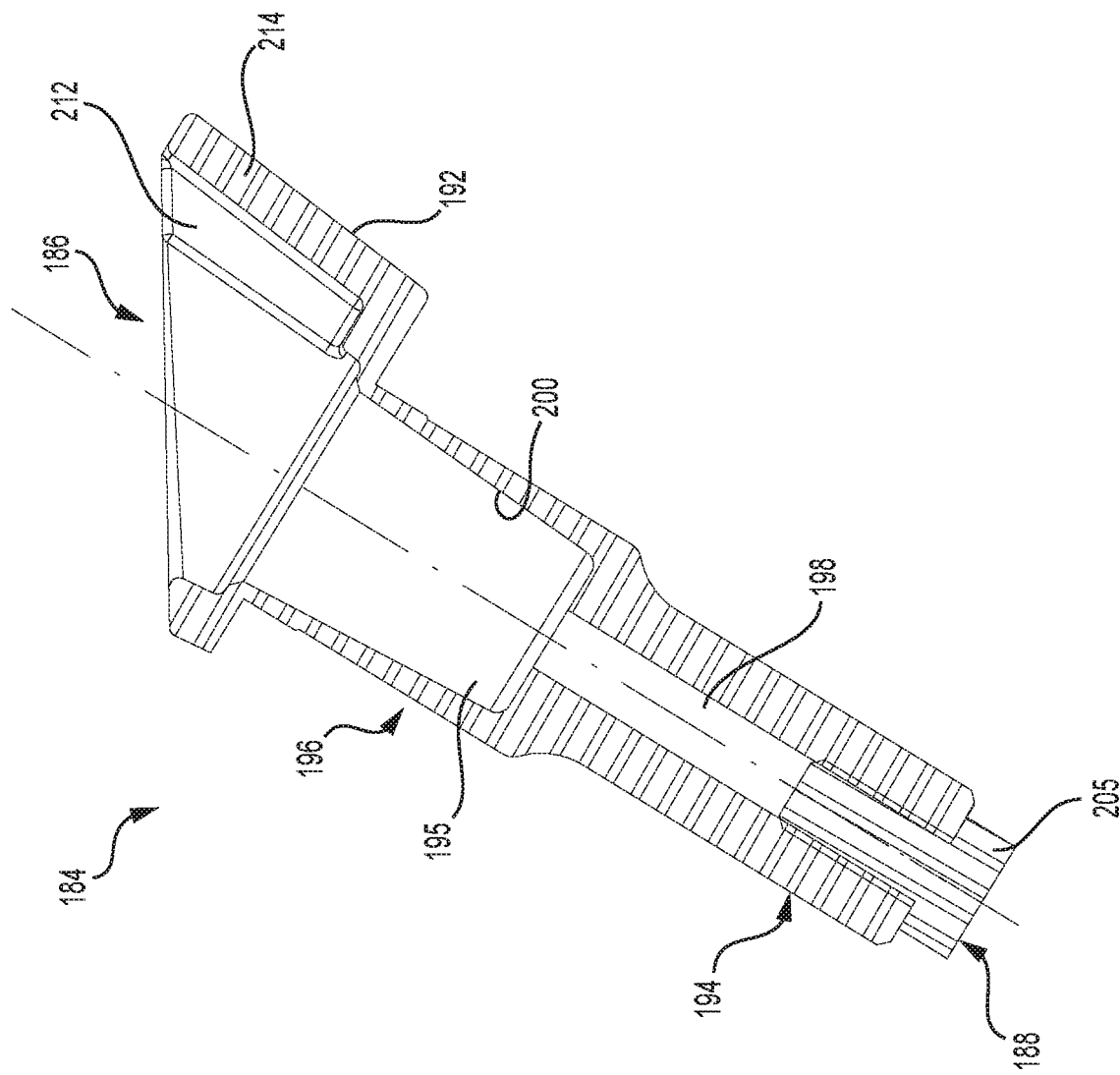
FIG. 22 is a cross-sectional view of the handlebar support receiving member of FIG. 19, taken along line 22-22 in FIG. 20.

As can be seen in FIG. 22, an internal space 195 extends through the upper, lower and central portions 192, 194, 196 of the handlebar support receiving member 184. In other words, the internal space 195 is defined by inner walls of the upper, lower and central portions 192, 194, 196. Part of the internal space 195 is defined by a threaded inner wall 198 of the lower portion 194. The threaded inner wall 198 threadedly engages the fastener 210 (FIG. 10), forming a screw joint. The fastener 210 is inserted into the handlebar support receiving member 184 through the open upper end 186. Moreover, in this embodiment, a fastener 205 engages the threaded inner wall 198 of the lower portion 194 by being inserted into the lower portion 194 by the lower end thereof. The fastener 205 is welded to the lower portion 194. As such, the fastener 205 closes off the bottom of the internal space 195 to define the closed lower end 188. It is contemplated that, in other embodiments, the handlebar support receiving member 184 could be made such that the lower portion 194 has a wall instead defining the closed lower end 188 rather than the fastener 205.

With continued reference to FIG. 22, another part of the internal space 195 is defined by an inner conical surface 200 of the central portion 196 of the handlebar support receiving member 184. The inner conical surface 200 faces the open upper end 186 of the handlebar support receiving member 184 (i.e., the diameter of the inner conical surface 200 is greater closer to the upper end 186 than to the closed end 188). The inner conical surface 200 is mated with the outer conical surface 177 of the base support 175 to secure the base support 175 to the handlebar support receiving member 184. Hence, the outer and inner conical surfaces 177, 200 are shaped to be complementary to one another. Given their mating relationship, the outer and inner conical surfaces 177, 200 may also be referred to as male and female conical surfaces 177, 200 respectively. During assembly of the steering system 142, the male and female conical surfaces 177, 200 are pressed against one another by the fastener 210 in order to fix the handlebar assembly 143 to the steering column assembly 146. In particular, the fastener 210 is inserted through the fastener-receiving opening 181 of the base support 175 and into the internal space 195 where the fastener 210 engages the threaded inner wall 198 of the lower portion 194. The fastener 210, when tightened, thus forces the mating of the male conical surface 177 and the female conical surface 200 which form a locking taper, also called a self-holding taper, that holds the handlebar assembly 143 affixed to the steering column assembly 146. Notably, even when the fastener 210 is removed from the assembly, the handlebar assembly 143 can remain affixed to the steering column assembly 146 via the locking taper formed by the male and female conical surfaces 177, 200. Thus in order to remove the handlebar assembly 143 from engagement with the steering column assembly 146, a puller tool (not shown) is used which pushes off against the closed end 188 of the handlebar support receiving member 184 to separate the base support 175 from the handlebar support receiving member 184.

It is contemplated that any suitable compression element other than a fastener 210 and/or a joining mechanism other than a screw joint may be used to compress the male and female conical surfaces 177, 200 against one another. For example, in some embodiments, a nut and bolt or a clamp could engage any part of the handlebar assembly 143 and the steering column assembly 146 to compress the male and female conical surfaces 177, 200 against one another.

Furthermore, it is contemplated that the male and female conical surfaces 177, 200 could be reversed. That is, in some embodiments, the male conical surface 177 could be provided on the handlebar support receiving member 184 while the female conical surface 200 is provided on the base support 175.

Figure 19:
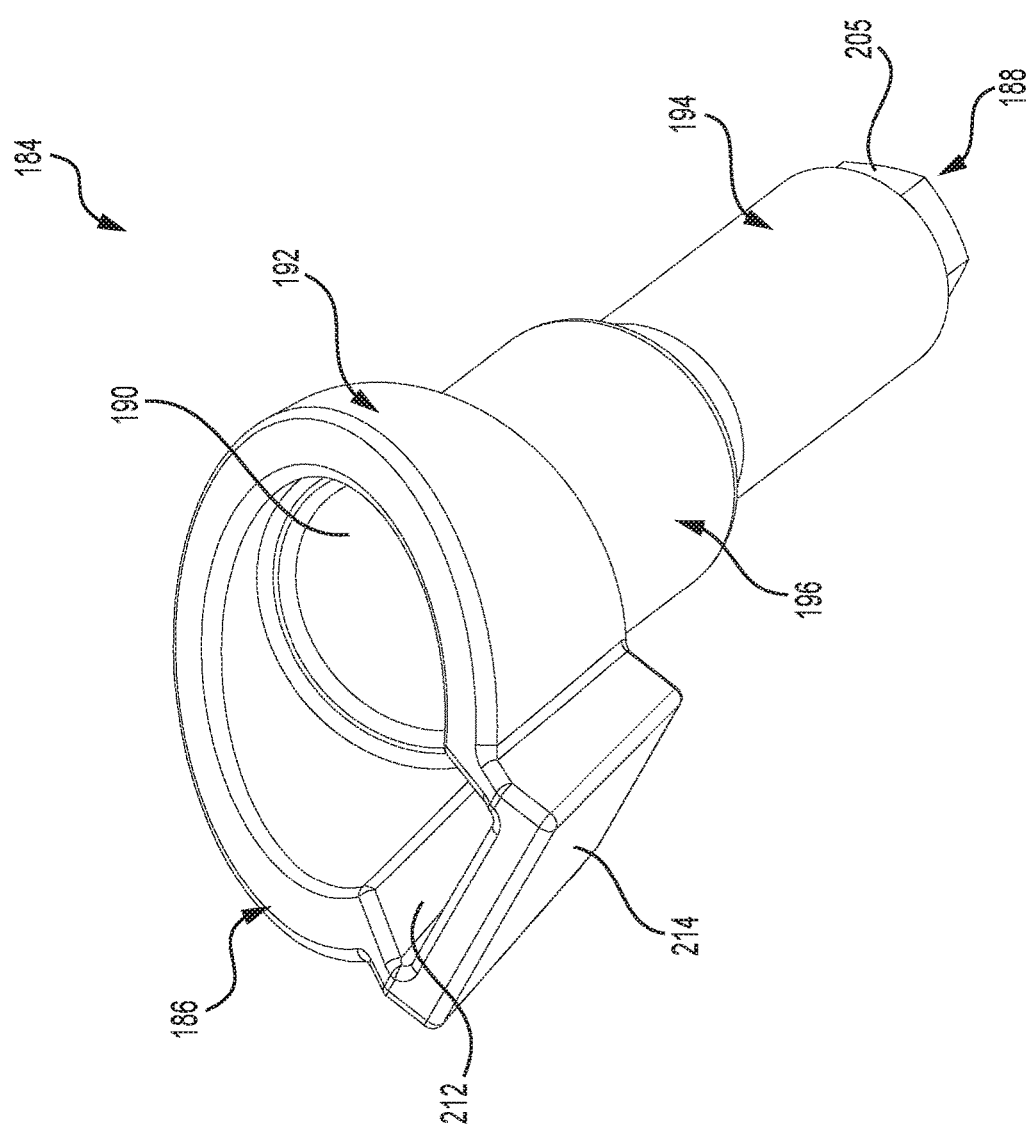
FIG. 19 is a rear, right, top side perspective view of a handlebar support receiving member of a steering column assembly of the steering system of FIG. 9.
Figure 20:
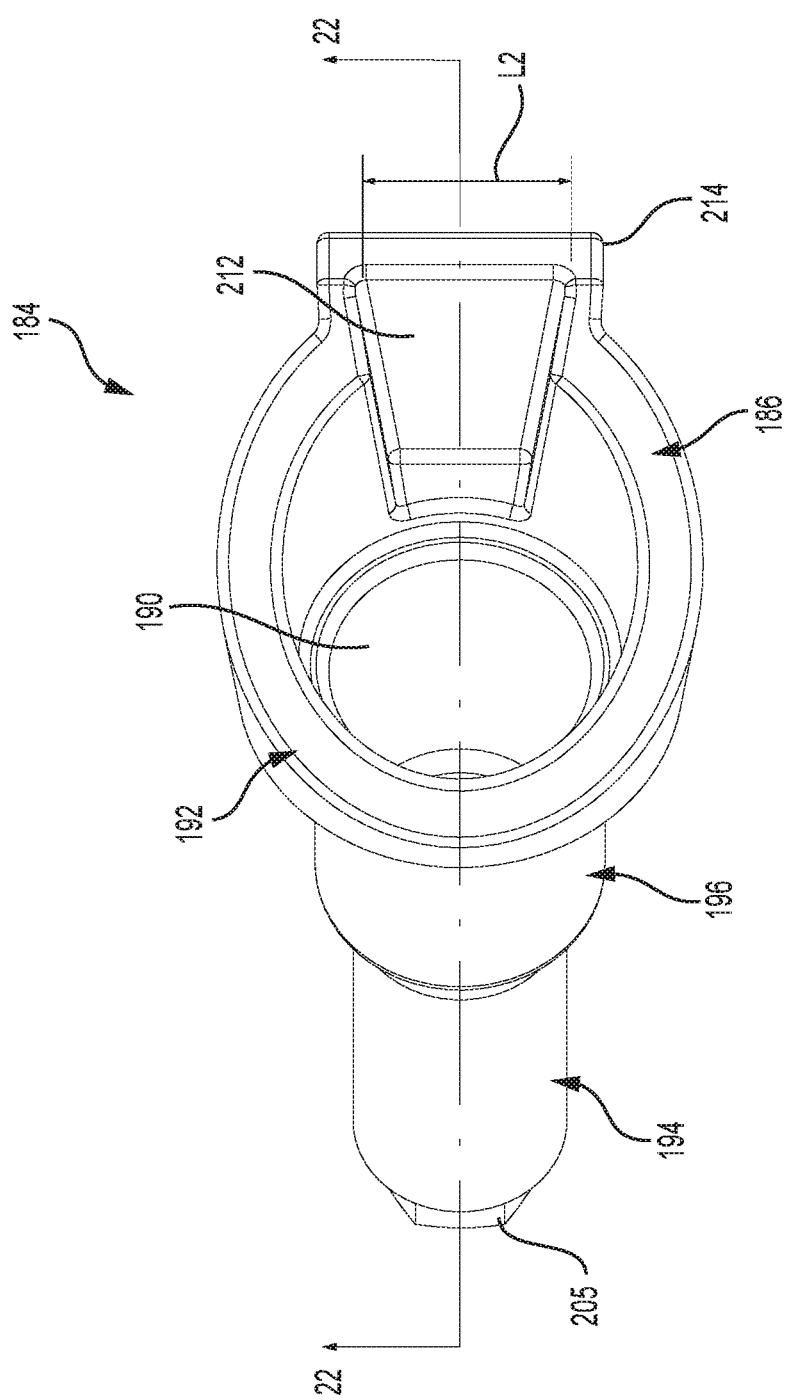
FIG. 20 is a top plan view of the handlebar support receiving member of FIG. 19.
Figure 21:
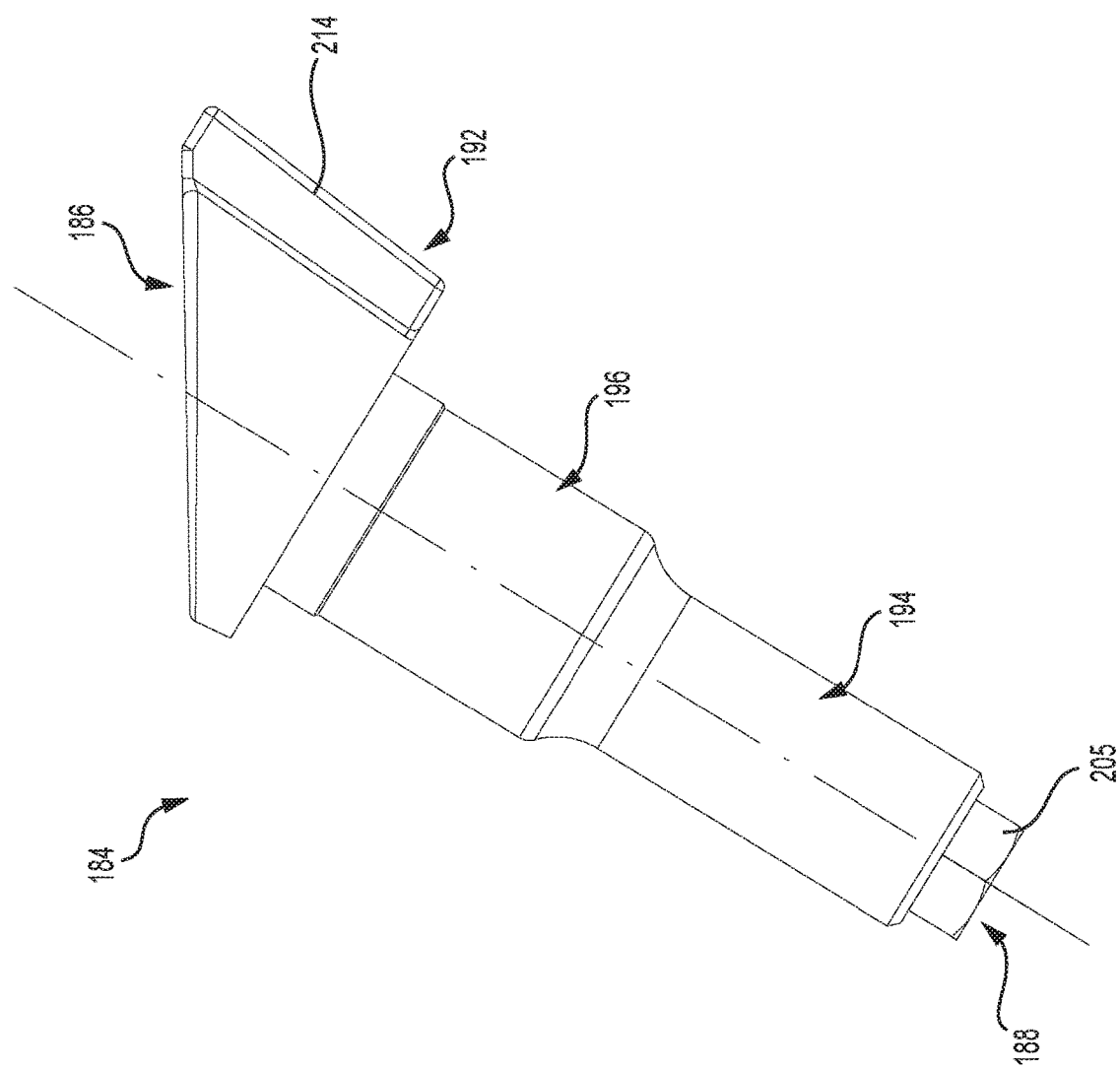
FIG. 21 is a left side elevation view of the handlebar support receiving member of FIG. 19.

As shown in FIG. 19, the upper portion 192 of the handlebar support receiving member 184 is generally shaped like a truncated tube such that the upper end 186 of the handlebar support receiving member 184 has a sloped edge (i.e., angled relative to a central axis of the handlebar support receiving member 184). The generally truncated tubular shape of the upper portion 192 has a diameter that is greater than the diameter of the cylindrical exterior of the central portion 196.

Figure 15:
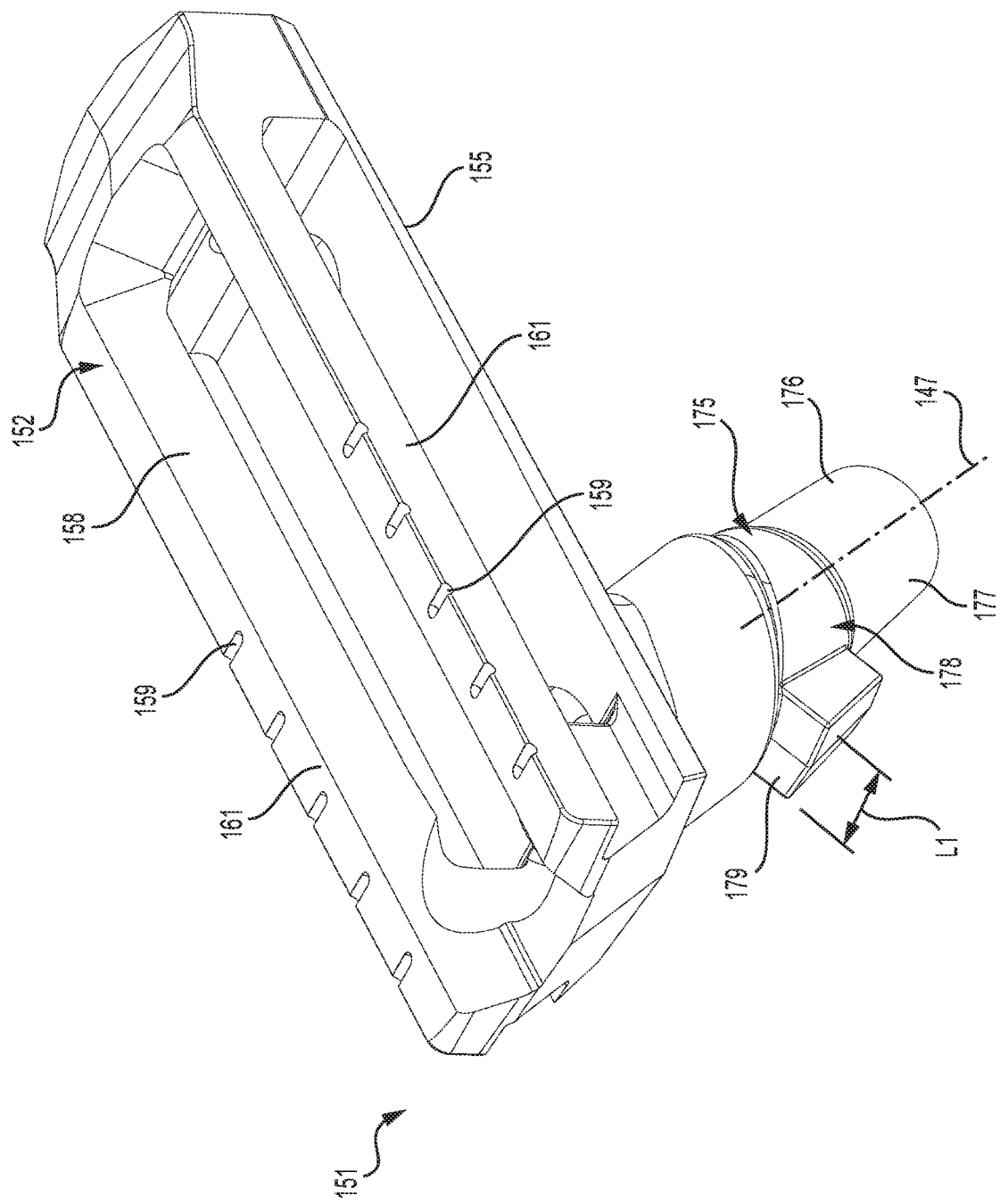
FIG. 15 is rear, right, top side perspective view of a base of the handlebar assembly of FIG. 12.
Figure 16:
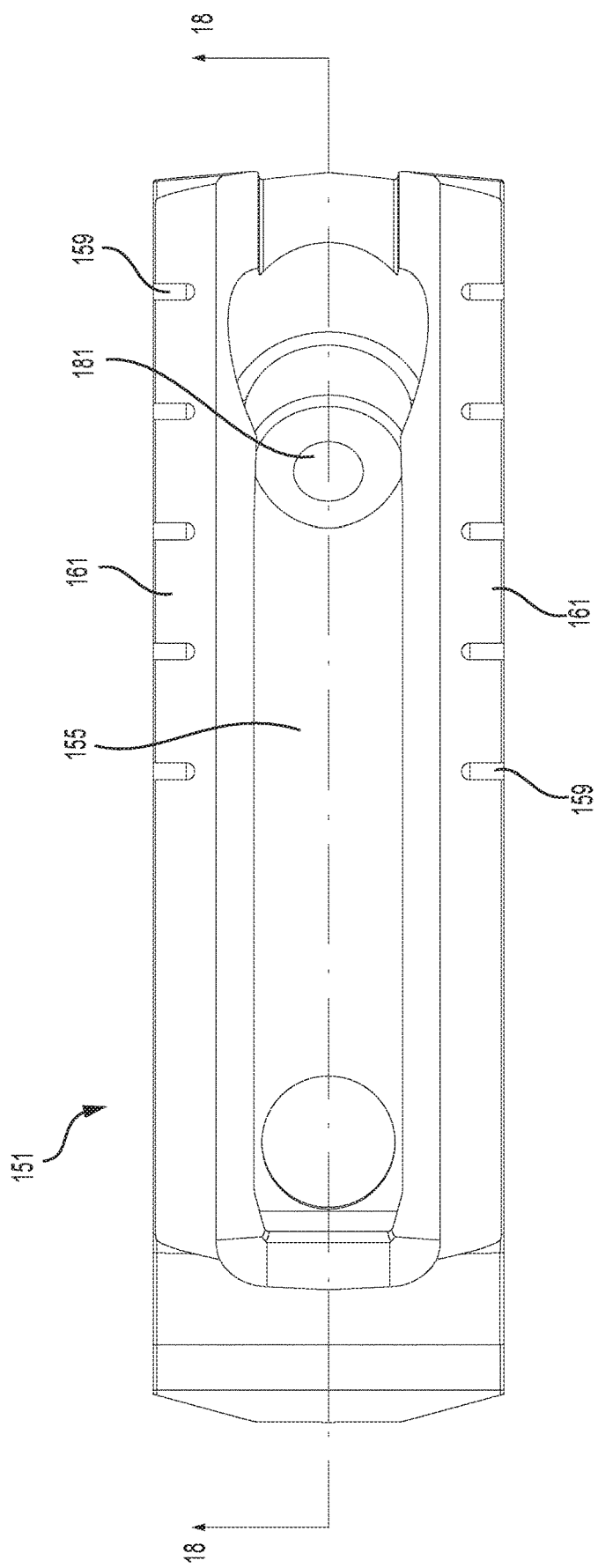
FIG. 16 is top plan view of the base of FIG. 15.

The upper portion 192 also has an angular position limiter 212 configured to engage the protrusion 179 of the base support 175 to limit the angular position of the handlebar assembly 143 relative to the steering column assembly 146 about the steering axis 147. In this embodiment, the angular position limiter 212 is a radially-extending groove formed by a wall portion 214 extending outwardly from the truncated tube of the upper portion 192. The radially-extending groove 212 receives the radially-extending protrusion 179 therein such that the angular position of the handlebar assembly 143 relative to the steering column assembly 146 is bound by the wall portion 214. Notably, the radially-extending groove 212 is larger than the radially-extending protrusion 179 such that the radially-extending protrusion 179 can be positioned within a range of angular positions about the steering axis 147 relative to the radially-extending groove 212. More specifically, a width L2 of the groove 212 (FIG. 20) is greater than a width L1 of the protrusion 179 (FIG. 15).

In this embodiment, the range of angular positions of the radially extending protrusion 179 relative to the radially-extending groove 212 about the steering axis 147 spans less than 10 degrees. More specifically, the range of angular positions of the radially extending protrusion 179 relative to the radially-extending groove 212 about the steering axis 147 spans less than 4 degrees. In particular, in this embodiment, the range of angular positions of the radially extending protrusion 179 relative to the radially-extending groove 212 about the steering axis 147 spans approximately 3.6 degrees. In other words, from a centered position in which the protrusion 179 is centered relative to the groove 212, the range of angular positions of the protrusion 179 relative to the groove 212 about the steering axis 147 allows an angular position adjustment of 1.8 degrees in each rotation direction about the steering axis 147.

The protrusion 179 and the groove 212 thus facilitate the adjustment of the alignment of the handlebar assembly 143 relative to the steering column assembly 146 while ensuring that the handlebar assembly 143 is not set to a position, relative to the steering column assembly 146, which is excessively offset.

It is contemplated that, in other embodiments, the respective positions of the protrusion 179 and the groove 212 could be inversed. For instance, the protrusion 179 could instead be provided on the handlebar support receiving member 184 while the groove 212 could be provided on the base support 175. Furthermore, it is contemplated that angular position limiters other than a protrusion and a groove could be implemented. For instance, the groove 212 could be replaced by two protrusions acting as stoppers, with the protrusion 179 being disposed therebetween.

Turning again to FIG. 5, the lower column portion 182 includes a first lower column portion 218 and a second lower column portion 220 which are connected to one another via a universal joint 222 such that rotary motion of the first lower column portion 218 (about the steering axis 147) is transmitted to the second lower column portion 220 via the universal joint 222. It is contemplated that the universal joint 222 could be replaced by a constant velocity joint or another form of rotation transmitting joint.

Figure 10:
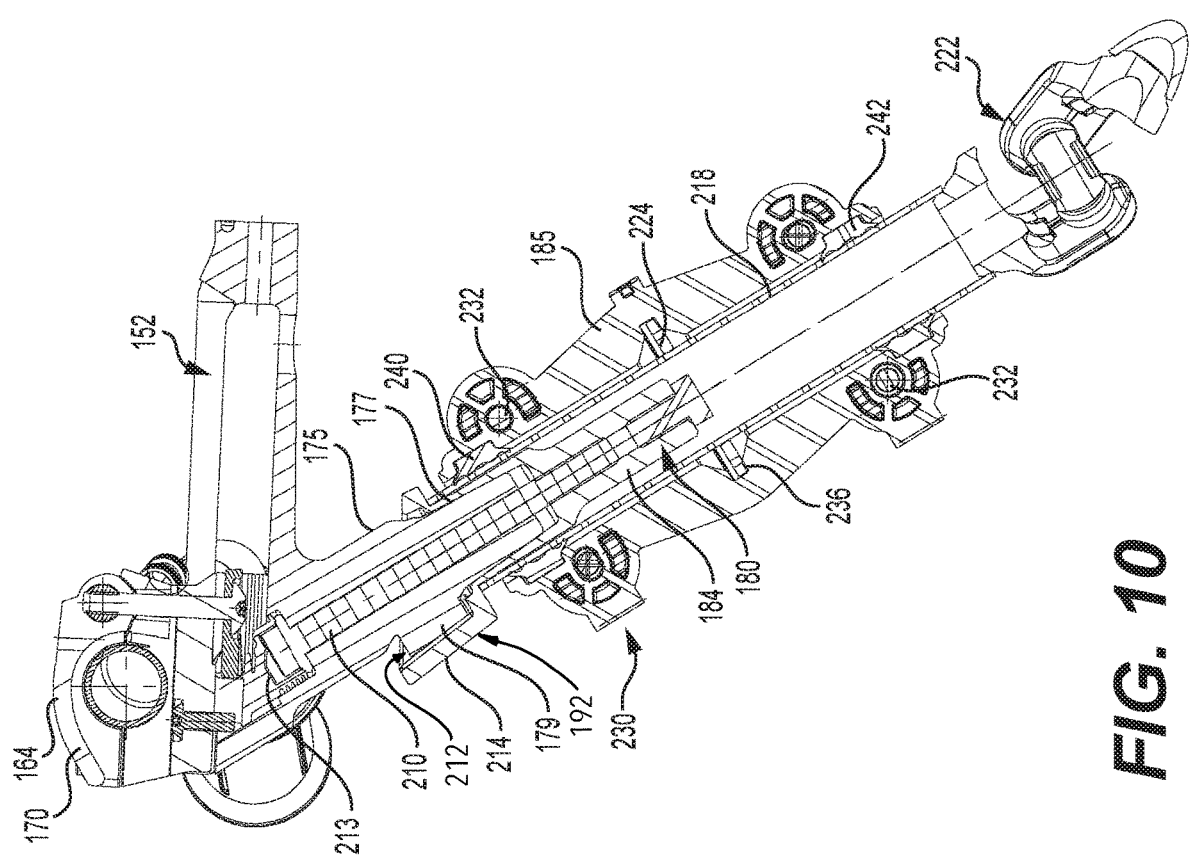
FIG. 10 is a cross-sectional view of an upper portion of the steering system of FIG. 9, taken along line 10-10 in FIG. 9.

In this embodiment, as can be seen in FIG. 11, the first lower column portion 218 is an elongate tube. The tube 218 has a circular flange 224 affixed (e.g., welded) thereto around a central portion thereof. The tube 218 receives part of the handlebar support receiving member 184 therein. More specifically, as shown in FIG. 10, the lower and central portions 194, 196 of the handlebar support receiving member 184 are inserted into the tube 218. Once in place in the tube 218, the handlebar support receiving member 184 is welded to the tube 218. As shown in FIG. 10, the upper portion 192 of the handlebar support receiving member 184 (including the groove 212) remains outside of the tube 218 given that the diameter of the truncated tubular shape of the upper portion 192 is greater than the diameter of the tube 218. The lower end of the tube 218 is affixed (e.g., welded) to the universal joint 222.

With reference to FIG. 10, the housing 185 encloses part of the handlebar support receiving member 184 and the tube 218 therein. The housing 185 is fixed (e.g., bolted) to the frame 108 of the vehicle 100. As shown in FIG. 11, the housing 185 has two portions 226, 228 which, in this embodiment, are molded together and are separated by a living hinge 230. The two portions 226, 228 are closed about the hinge 230 to form the housing 185 by inserting fasteners 232 (e.g., bolts) into corresponding openings of the two portions 226, 228 and securing the fasteners 232 with corresponding fastener-receiving elements 234 (e.g., nuts). In the illustrated embodiment, the bolts 232 are also used to fix the housing 185 to the frame of the vehicle. An internal space formed by the housing 185 receives the tube 218 therein. Moreover, a radial groove 236 (FIG. 10) defined by the housing 185 around a central portion thereof receives the flange 224 therein. As such, once the housing 185 is closed about the tube 218, the flange 224 is enclosed within the radial groove 236 thus not permitting the tube 218 from moving axially relative to the housing 185. Rather, via the flange 224, the housing 185 receives axial loads applied to the handlebar 144 via the upper connecting portion 180 and conveys those loads onto the frame 108. The housing 185 also has sealing members 240, 242 (e.g., gaskets) at its upper and lower ends which sealingly surround the tube 218.

It is contemplated that, in other embodiments, the two portions 226, 228 of the housing 185 could be made separately and be fixed to one another to surround the tube 218.

Figure 6:
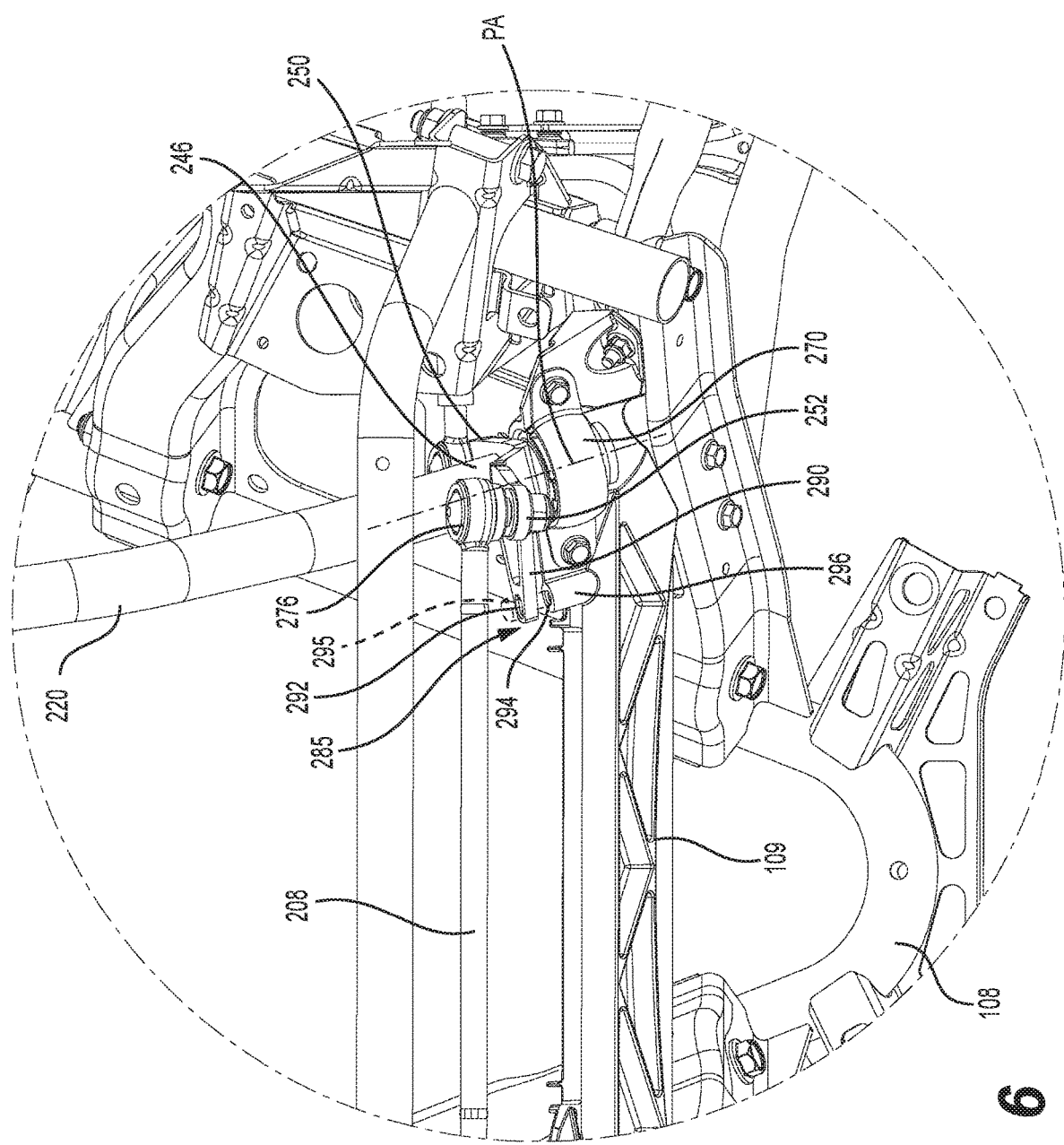
FIG. 6 is a close-up front view of part of the components of FIG. 4.

With reference to FIG. 9, an upper end 244 of the second lower column portion 220 is affixed (e.g., welded) to the universal joint 222. In this embodiment, the second lower column portion 220 is a tubular shaft which, as shown in FIG. 9, is shaped such that its lower end 246 is offset to the left relative to its upper end 244, and is disposed leftward of the longitudinal centerplane 106. As seen in FIG. 6, the lower end 246 of the shaft 220 is pivotally connected to a laterally extending positioning frame member 109 of the frame 108. Notably, in this embodiment, a bearing 270 receives the lower end 246 of the shaft 220 and is connected to the positioning frame member 109 of the frame 108.

In this embodiment, the steering column assembly 146 includes a Pitman arm 250 which is welded to the lower end 246 of the shaft 220 and, as shown in FIG. 9, extends radially at a lower end of the steering column assembly 146. More specifically, the Pitman arm 250 extends radially outward from the lower end 246 of the shaft 220. To that end, the Pitman arm 250 is connected to the shaft 220 such that the Pitman arm 250 rotates together with a remainder of the steering column assembly 146. In particular, the Pitman arm 250 rotates, along with the shaft 220 connected thereto, about a Pitman arm rotation axis PA (FIG. 6). In this embodiment, the Pitman arm 250 is positioned leftward of the longitudinal centerplane 106. It is contemplated that, in other embodiments, the Pitman arm 250 could be positioned rightward of the longitudinal centerplane 106, in which case the shaft 220 would extend rightward instead of leftward. Alternatively, it is contemplated that the Pitman arm 250 could be centered relative to the longitudinal centerplane 106, in which case the shaft 220 would extend centrally.

The Pitman arm 250 can be shaped and dimensioned in many different ways, thus it should be understood that the term "Pitman aim" is hereby defined as a mechanical element that extends radially outward from and rotates with a steering column and pivotally connects to at least one linkage (e.g., a tie rod) so as to convert rotation of the steering column to a translation of the linkage(s).

Figure 23:
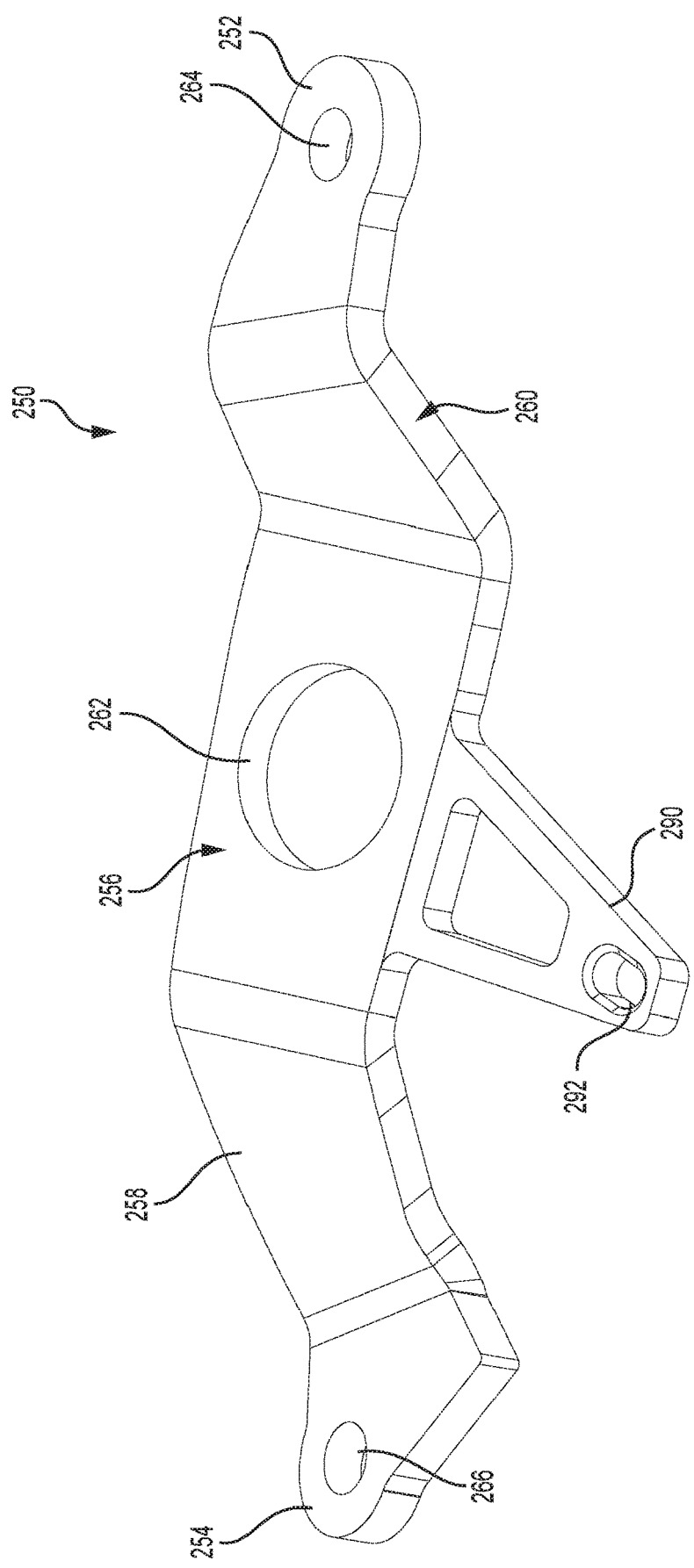
FIG. 23 is a top, right side perspective view of a Pitman arm of the steering column assembly of the steering system of FIG. 9.
Figure 24:
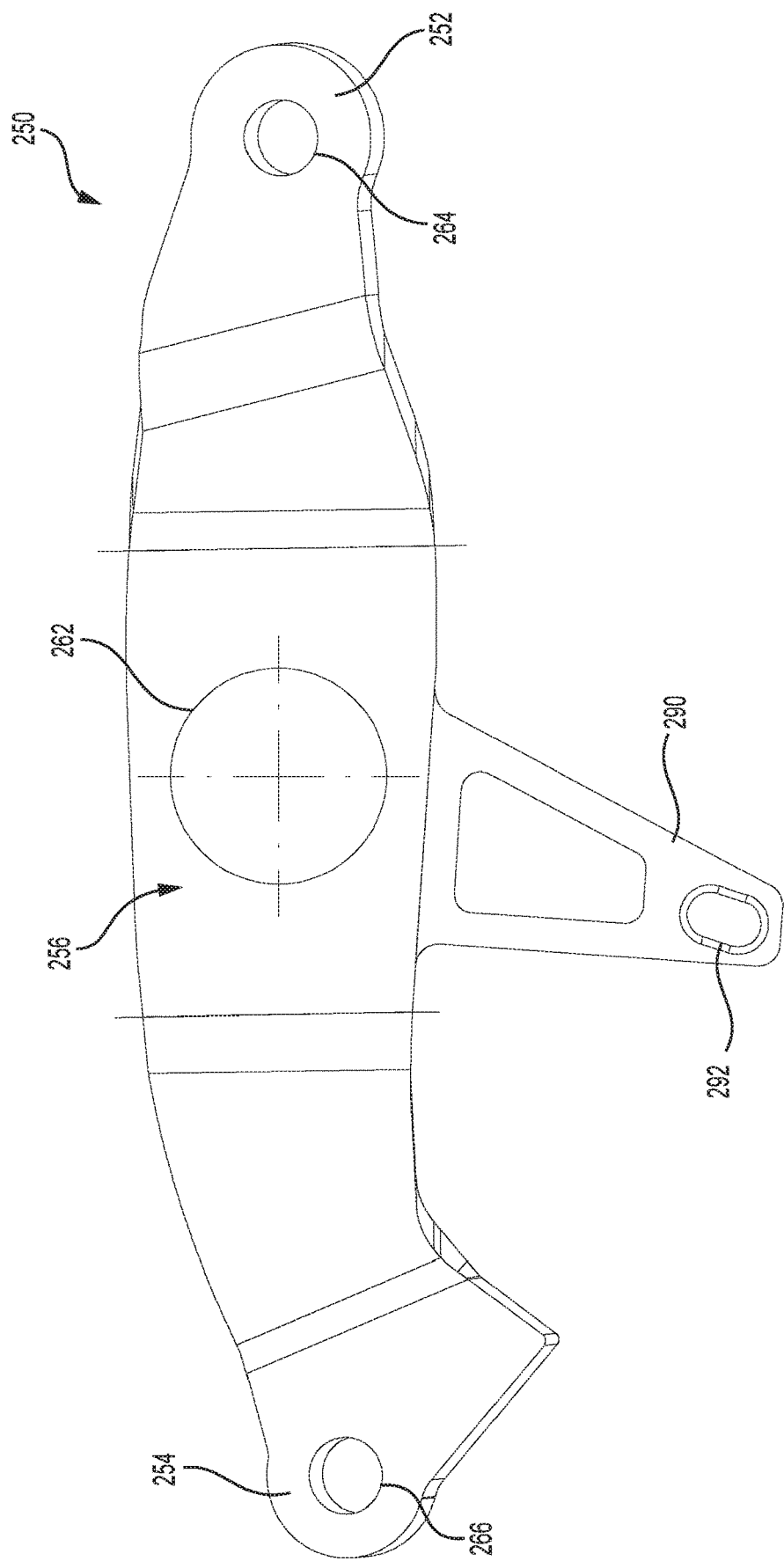
FIG. 24 is a top plan view of the Pitman arm of FIG. 23.
Figure 25:
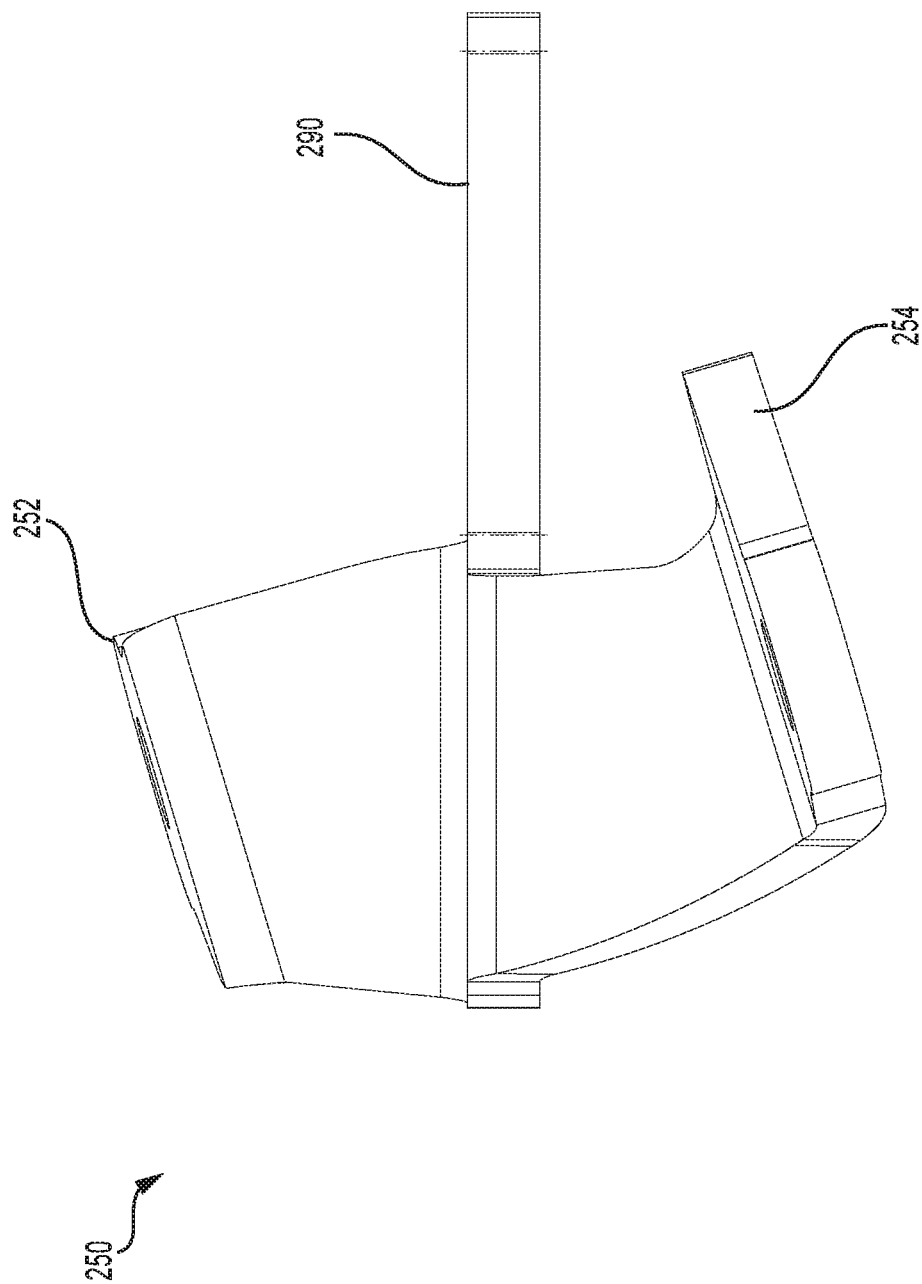
FIG. 25 is a rear elevation view of the Pitman arm of FIG. 23.

With reference to FIGS. 23 to 25, the Pitman arm 250 has opposed ends 252, 254. The end 252 of the Pitman arm 250 may be referred to as a front end since, when the Pitman arm 250 is in a position corresponding to a straight orientation of the front wheels 110, 114, the end 252 is generally positioned forwardly of the end 254 which may in turn be referred to as a rear end. As can be seen in FIG. 9, in this embodiment, the front end 252 of the Pitman arm 250 is disposed vertically higher than the rear end 254 of the Pitman arm 250. The front and rear ends 252, 254 define respective openings 264, 266 which are provided to operatively connect the linkages 202, 208 to the Pitman arm 250. A central portion 256 of the Pitman arm 250 (between the front and rear ends 252, 254) is disposed vertically higher than the rear end 254 of the Pitman arm 250 but vertically lower than the front end 252. Angled portions 258, 260 are disposed between the front end 252, the rear end 254, and the central portion 256. The shaft 220 extends through an opening 262 defined by the central portion 256, below which it is received in the bearing 270.

With reference to FIG. 9, in this embodiment, the linkages 202, 204 are left and right tie rods that operatively connect the Pitman arm 250 to the front wheels 110, 114 respectively. The left and right tie rods 202, 204 are adjustable to vary their respective lengths. The manner in which the length of a tie rod is adjusted is known and thus will not be described in greater detail here.

The left tie rod 202 is pivotally connected to the rear end 254 of the Pitman arm 250 via a rod end 272. The left tie rod 202 extends leftward and forward from the Pitman arm 250. The left tie rod 202 is pivotally connected to the left steering knuckle 117 via a rod end 274. The rod end 274 connects to the left steering knuckle 117 at a point rearward of a left pivot axis 275 about which the left steering knuckle 117 is pivotable.

The right tie rod 202 and the linkages 206, 208 operatively connect the Pitman arm 250 to the right steering knuckle 119. Notably, the linkage 208 is a central link that is pivotally connected to the front end 252 of the Pitman arm 250 via a rod end 276 received at the opening 264 of the Pitman arm 250. The central link 208 extends rightward from the Pitman arm 250 through the longitudinal centerplane 106 and pivotally connects to a front end of the linkage 206 via a rod end 278. As such, the central link 208 extends between the Pitman arm 250 and the idler arm 206.

Figure 7:
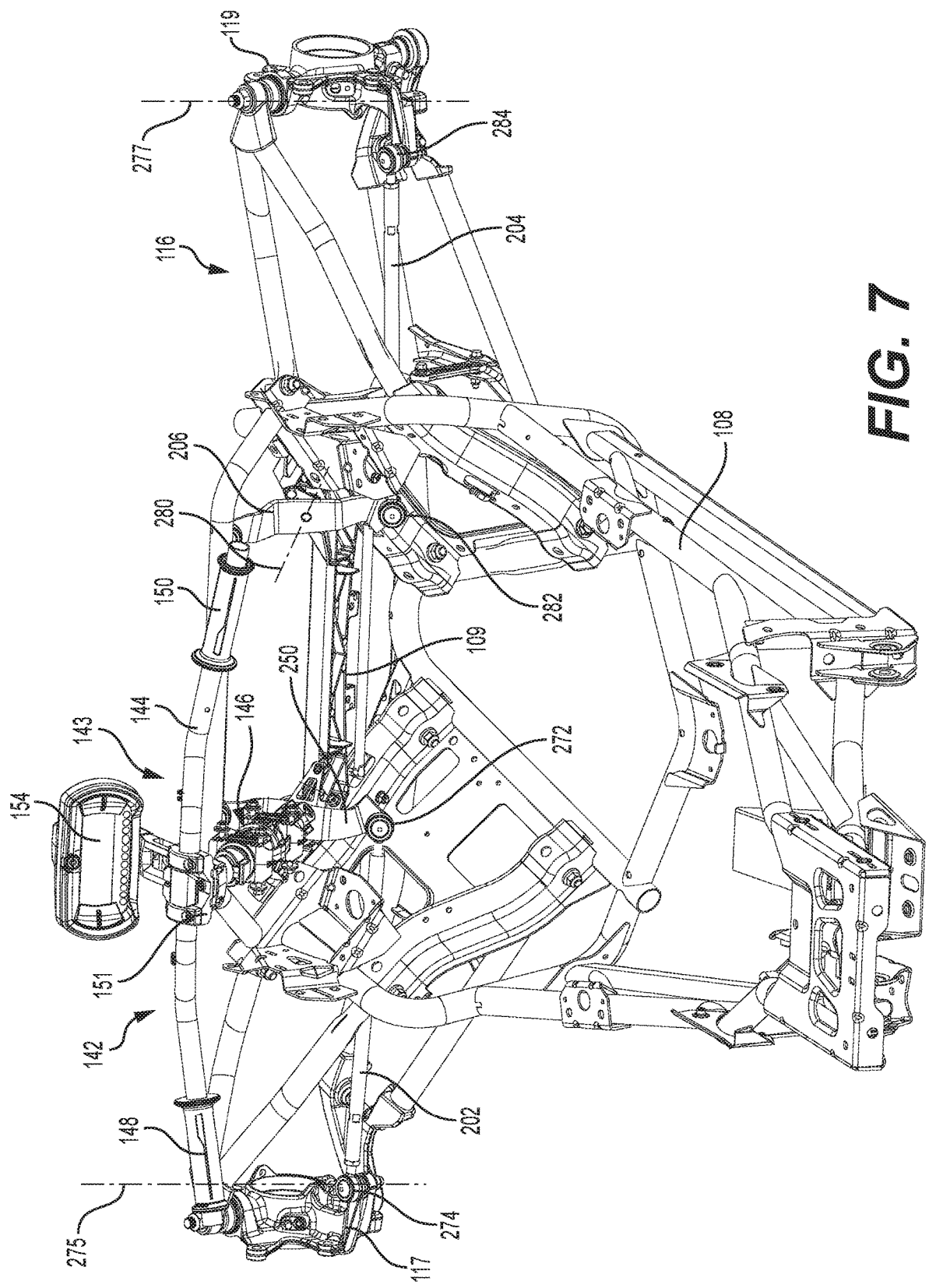
FIG. 7 is a rear, right, top side perspective view of the components of FIG. 4.

The linkage 206 is an idler arm and that is operatively connected to the Pitman arm 250 via the central link 208. The idler arm 206 is pivotally connected to the positioning frame member 109, rightward of the longitudinal centerplane 106. Notably, the idler arm 206 is pivotally connected to the positioning frame member 109 about an idler arm pivot axis 280 (FIG. 7) via a pivot assembly (not shown) which, in this embodiment, includes a rod end. It is contemplated that the idler arm 206 could be pivotally connected to the positioning frame member 109 via any other suitable pivotable connection.

It is contemplated that, in other embodiments, the Pitman arm 250 could be positioned rightward of the longitudinal centerplane 106 and that the idler arm 206 could be positioned leftward of the longitudinal centerplane 106.

The right tie rod 204 is pivotally connected to a rear end of the idler arm 206 via a rod end 282. The central link 208 is positioned forward of both rod ends 272, 282. The right tie rod 204 extends rightward and forward from the idler arm 206. The right tie rod 204 is pivotally connected to the right steering knuckle 119 via a rod end 284. The rod end 284 connects to the right steering knuckle 119 at a point rearward of a right pivot axis 277 (FIG. 7) about which the right steering knuckle 119 is pivotable.

The configuration of the Pitman arm 250, the tie rods 202, 204, the idler arm 206 and the central link 208 results in that rotation of the Pitman arm 250 about the Pitman arm rotation axis PA defined by the bearing 270 causes the left and right tie rods 202, 204 to be displaced in the same direction. In turn, this causes the steering knuckles 117, 119 to rotate about their respective axes 275, 277 thus steering the front wheels 110, 114 in response to the input by the driver at the handlebar 144.

A detailed description of the manner in which the Pitman arm 250 is connected to the linkages 202, 204, 206, 208 is provided in PCT Patent Application PCT/IB2018/050613, which is incorporated by reference herein.

Figure 8:
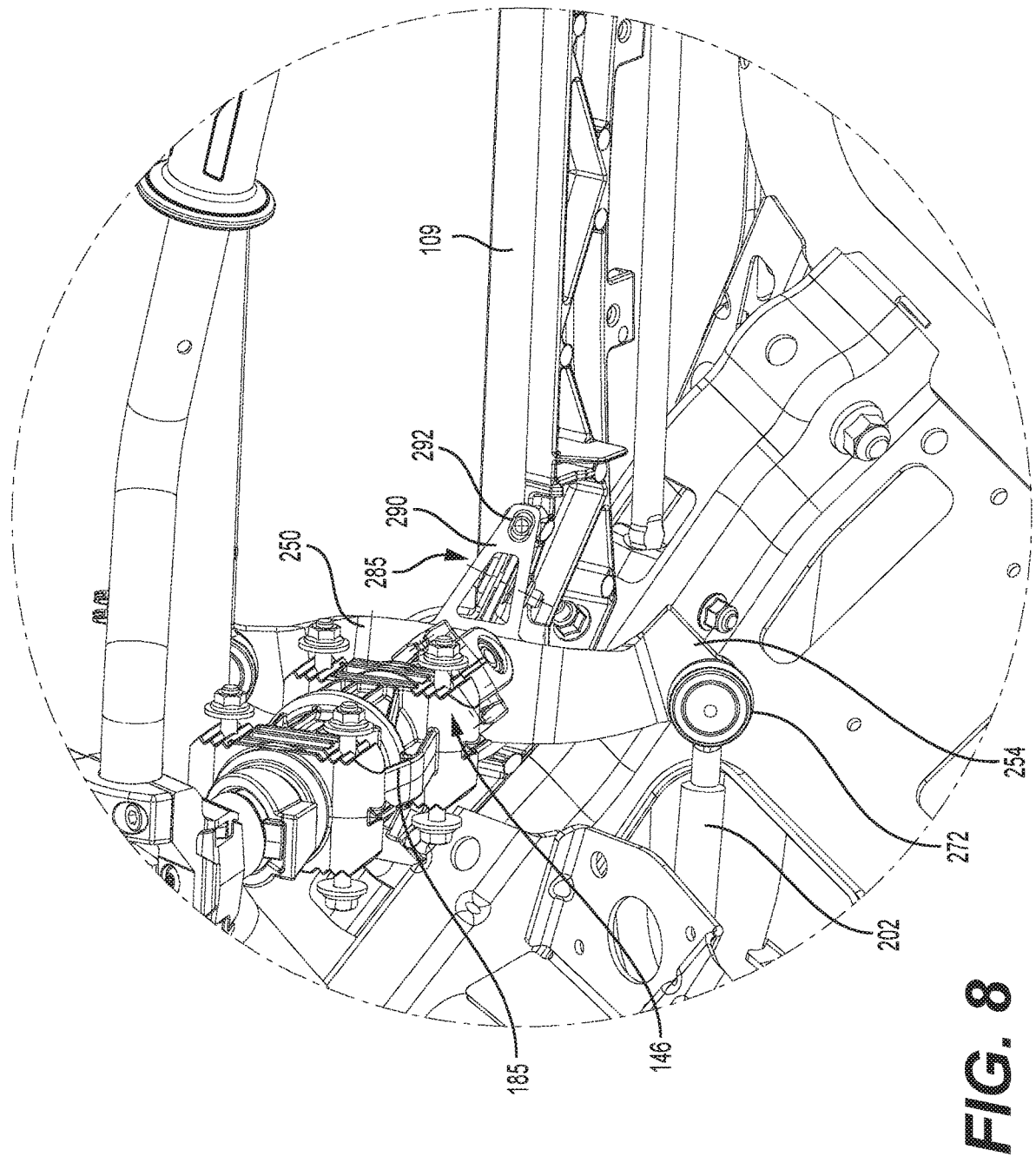
FIG. 8 is a close-up view of part of FIG. 7.

As will be described below, the steering system 142 is configured to minimize misalignment of the components thereof extending between the tie rods 202, 204 and the handlebar 144. To that end, as shown in FIGS. 6 and 8, the steering system 142 includes a lock 285 for locking the Pitman arm 250 with respect to the frame 108 of the vehicle 100.

With reference to FIGS. 6, 8 and 23 to 25, in this embodiment, the lock 285 includes an attachment extension 290 of the steering column assembly 146. More specifically, the attachment extension 290 extends laterally outwardly from Pitman arm 250. In this embodiment, the attachment extension 290 is generally triangular, however it is contemplated that the attachment extension 290 could have any other shape. The attachment extension 290 defines an opening 292 which, during assembly of the vehicle 100, is aligned with a corresponding opening 294 (FIG. 6) defined by an alignment boss 296 of the positioning frame member 109 of the frame 108. Notably, the opening 294 is positioned such that, when the openings 292, 294 are aligned with one another, the Pitman arm 250 is set to a "zero position" whereby the pivot points defined by the rod ends 272, 274, 276 are respectively symmetrical to the pivot points defined by the rod ends 282, 284, 278 about the longitudinal centerplane 106, and which is made to correspond to the straight vehicle movement orientation of the front wheels 110, 114. It is contemplated that the opening 294 could be defined by any other suitable frame member of the frame 108. Once the openings 292, 294 are aligned, a fastener is then inserted through both openings 292, 294 to set the attachment extension 290, and thus the Pitman arm 250, in place.

It is contemplated that, in some embodiments, the attachment extension 290 could be omitted and the opening 292 could instead be defined by any other suitable part of the steering column assembly 146 (e.g., by the Pitman arm 250 itself), the tie rods 202, 204, the idler arm 206, or the central link 208.

Thus, during assembly of the vehicle 100, in order to align the steering system 142 to a zero position corresponding to the straight vehicle movement orientation of the front wheels 110, 114, the openings 292, 294 are aligned and a fastener 295 (shown in dotted lines in FIG. 6) is inserted through the openings 292, 294 to set the attachment extension 290 (and the Pitman arm 250) in place. As discussed above, this sets the Pitman arm 250 to its zero position and ensures that the pivot points defined by the rod ends 272, 274, 276 are respectively symmetrical to the pivot points defined by the rod ends 282, 284, 278 about the longitudinal centerplane 106. Next, the length of each the left and right tie rods 202, 204 is adjusted as needed to ensure that the front wheels 110, 114 are aligned in their straight vehicle movement orientation. It is to be understood that the front wheels 110, 114 could have a toe-in angle or toe-out angle and that their straight vehicle movement orientation does not require the front wheels 110, 114 to be straight. The adjustment of the tie rods 202, 204 does not affect the zero position of the Pitman arm 250 since the latter is set in place by the fastener 295 extending through the openings 292, 294. The angular position of the handlebar assembly 143 relative to the steering column assembly 146 is then set such that the handlebar 144 is generally straight (i.e., centered with respect to the longitudinal centerplane 106) as permitted by the range of angular positions that the handlebar assembly 143 can assume relative to the steering column assembly 146 bound by the protrusion 179 and the groove 212. The handlebar assembly 143 is then fixed in place by clamping the conical surfaces 177, 200 against one another via the fastener 210 as described above. The fastener 295 extending through the openings 292, 294 is then removed to allow rotation of the Pitman arm 250.

As will be understood, this process of aligning the steering system 142 sets the Pitman arm 250 to its zero position when the front wheels 110, 114 are aligned thus ensuring that the dynamics of the vehicle 100 are not negatively affected by a misaligned Pitman arm 250.

Furthermore, it should be understood that while the steering system 142 described herein uses the Pitman arm 250 to operatively pivotally connect to the tie rods 202, 204, it is contemplated that the Pitman arm 250 could be replaced with a rack-and-pinion assembly and similar benefits would result from properly setting the rack-and-pinion assembly to its zero position as has been disclosed herein with respect to the Pitman arm 250.

Modifications and improvements to the above-described embodiment of the present technology may become apparent to those skilled in the art. The foregoing description is intended to be exemplary rather than limiting.

What is claimed is:

1. A steering system for a vehicle, the vehicle having at least one ground-engaging member, the steering system comprising:
    a handlebar assembly comprising:
        a first conical surface; and
        a first angular position limiter;
    a steering column assembly connected to the handlebar assembly, the steering column assembly comprising:
        a second conical surface mated with the first conical surface;
        a second angular position limiter configured to engage the first angular position limiter to limit an angular position of the handlebar assembly relative to the steering column assembly about a steering axis of the steering system; and
        a Pitman arm extending radially outward at a lower end of the steering column assembly, the Pitman arm rotating together with a remainder of the steering column assembly;
    a compression element engaging the handlebar assembly and the steering column assembly to compress the first and second conical surfaces against one another in order to fix the handlebar assembly to the steering column assembly;
    a plurality of linkages configured to operatively connect the steering column assembly to the at least one ground-engaging member, the Pitman arm being pivotally connected to the plurality of linkages; and
    a lock for locking the Pitman arm with respect to a frame of the vehicle during assembly thereof, the lock comprising an opening defined by one of:
        the steering column assembly; and
        the plurality of linkages,
        the opening of the one of the steering column assembly and the plurality of linkages being configured to be aligned with a corresponding opening defined by the frame of the vehicle when the Pitman arm is in a zero position.

2. The steering system of claim 1, wherein the first conical surface is a male conical surface and the second conical surface is a female conical surface.

3. The steering system of claim 1, wherein:
the first angular position limiter is one of a radially-extending protrusion and a radially-extending groove;
the second angular position limiter is an other one of the radially-extending protrusion and the radially-extending groove; and
the radially-extending groove receives the radially-extending protrusion therein.

4. The steering system of claim 3, wherein:
the handlebar assembly comprises the radially-extending protrusion; and
the steering column assembly comprises the radially-extending groove.

5. The steering system of claim 3, wherein the radially-extending groove is larger than the radially-extending protrusion such that the radially-extending protrusion can be positioned within a range of angular positions about the steering axis relative to the radially-extending groove.

6. The steering system of claim 5, wherein the range of angular positions spans less than 10 degrees.

7. The steering system of claim 6, wherein the range of angular positions spans less than 4 degrees.

8. The steering system of claim 7, wherein the range of angular positions spans approximately 3.6 degrees.

9. The steering system of claim 1, wherein the compression element is a fastener that extends through the handlebar assembly and threadedly engages the steering column assembly.

10. The steering system of claim 1, wherein:
the handlebar assembly comprises a handlebar and a base, the handlebar being affixed to the base; and
the base comprises the first conical surface and the first angular position limiter.

11. The steering system of claim 1, wherein:
the steering column assembly comprises an upper connecting portion connected to the handlebar assembly and a column portion extending downward from the upper connecting portion; and
the upper connecting portion comprises the second conical surface and the second angular position limiter.

12. The steering system of claim 11, wherein:
the column portion is a first column portion;
the steering column assembly further comprises:
a second column portion; and
a universal joint connecting the first and second column portions.

13. The steering system of claim 11, wherein:
the steering column assembly further comprises a housing enclosing at least part of the upper connecting portion; and
the housing receives an axial load applied thereto by the upper connecting portion of the steering column assembly.

14. The steering system of claim 11, wherein:
the column portion comprises a tube; and
the upper connecting portion comprises a handlebar support receiving member at least partly inserted within the tube, the handlebar support receiving member defining the second conical surface and the second angular position limiter.

15. The steering system of claim 1, wherein the plurality of linkages includes at least one tie rod.

16. The steering system of claim 1, wherein:
the at least one ground-engaging member includes two ground-engaging members; and
the plurality of linkages includes two tie rods.

17. The steering system of claim 1, wherein the one of the steering column assembly and the plurality of linkages is the steering column assembly.

18. The steering system of claim 17, wherein the steering column assembly further comprises an attachment extension connected to the Pitman arm, the attachment extension defining the opening.

19. A vehicle comprising:
a frame;
a seat mounted to the frame;
at least one steerable ground-engaging member mounted to the frame;
at least one suspension assembly connecting the at least one steerable ground-engaging member to the frame; and
the steering system of claim 1.

20. A steering system for a vehicle, the vehicle having at least one ground-engaging member, the steering system comprising:
a handlebar assembly comprising:
a first conical surface; and
a first angular position limiter;
a steering column assembly connected to the handlebar assembly, the steering column assembly comprising:
an upper connecting portion connected to the handlebar assembly, the upper connecting portion comprising a handlebar support receiving member, the handlebar support receiving member defining:
a second conical surface mated with the first conical surface; and
a second angular position limiter configured to engage the first angular position limiter to limit an angular position of the handlebar assembly relative to the steering column assembly about a steering axis of the steering system; and
a column portion extending downward from the upper connecting portion, the column portion comprising a tube, the handlebar support receiving member being at least partly inserted within the tube;
a compression element engaging the handlebar assembly and the steering column assembly to compress the first and second conical surfaces against one another in order to fix the handlebar assembly to the steering column assembly; and
a plurality of linkages configured to operatively connect the steering column assembly to the at least one ground-engaging member.

21. The steering system of claim 20, wherein:
the first angular position limiter is one of a radially-extending protrusion and a radially-extending groove;
the second angular position limiter is an other one of the radially-extending protrusion and the radially-extending groove; and
the radially-extending groove receives the radially-extending protrusion therein.

22. The steering system of claim 20, wherein the compression element is a fastener that extends through the handlebar assembly and threadedly engages the steering column assembly.

\* \* \* \* \*